(12) United States Patent
Tawara et al.

(10) Patent No.: US 10,186,084 B2
(45) Date of Patent: Jan. 22, 2019

(54) IMAGE PROCESSING TO ENHANCE VARIETY OF DISPLAYABLE AUGMENTED REALITY OBJECTS

(71) Applicant: SONY CORPORATION, Tokyo (JP)

(72) Inventors: Tetsuo Tawara, Tokyo (JP); Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 221 days.

(21) Appl. No.: 14/293,134

(22) Filed: Jun. 2, 2014

(65) Prior Publication Data

US 2014/0368542 A1 Dec. 18, 2014

(30) Foreign Application Priority Data

Jun. 17, 2013 (JP) ................................ 2013-126616

(51) Int. Cl.
*G09G 5/00* (2006.01)
*G06T 19/00* (2011.01)
*G06K 9/32* (2006.01)

(52) U.S. Cl.
CPC .......... *G06T 19/006* (2013.01); *G06K 9/3216* (2013.01)

(58) Field of Classification Search
None
See application file for complete search history.

(56) References Cited

U.S. PATENT DOCUMENTS

| 8,872,852 | B2 * | 10/2014 | Deffeyes | G06T 19/006 345/633 |
| 2006/0038833 | A1 * | 2/2006 | Mallinson | A63F 13/02 345/633 |
| 2006/0050087 | A1 * | 3/2006 | Tanimura | G06F 3/011 345/629 |
| 2006/0239525 | A1 * | 10/2006 | Katayama | G06T 19/006 382/128 |
| 2010/0331043 | A1 * | 12/2010 | Chapman | G01C 21/20 455/556.1 |
| 2011/0169861 | A1 * | 7/2011 | Suzuki | G06T 19/006 345/632 |
| 2011/0187743 | A1 * | 8/2011 | Hwang | G06F 17/30047 345/633 |
| 2011/0212285 | A1 * | 9/2011 | Buck | G09F 3/0288 428/41.8 |
| 2011/0281644 | A1 * | 11/2011 | Kawamoto | G06T 19/006 463/30 |
| 2012/0038668 | A1 * | 2/2012 | Kim | G06F 3/011 345/633 |

(Continued)

FOREIGN PATENT DOCUMENTS

JP 2013-092964 A 5/2013

*Primary Examiner* — David H Chu
(74) *Attorney, Agent, or Firm* — Chip Law Group

(57) ABSTRACT

There is provided an image processing apparatus including an image acquisition unit configured to acquire an image that shows a real object including a primary recognition target and a secondary recognition target, and a control unit configured to set an augmented reality space associated with the image on the basis of image recognition of the primary recognition target, and configured to decide an augmented reality object to be arranged in the augmented reality space depending on the secondary recognition target that is recognized on the basis of the image recognition of the primary recognition target.

17 Claims, 18 Drawing Sheets

(56) References Cited

U.S. PATENT DOCUMENTS

| | | | |
|---|---|---|---|
| 2012/0075343 A1* | 3/2012 | Chen | G09G 5/397 345/633 |
| 2012/0108332 A1* | 5/2012 | Baseley | A63F 13/42 463/31 |
| 2012/0154439 A1* | 6/2012 | Ahn | G06T 19/006 345/633 |
| 2012/0218299 A1* | 8/2012 | Hayakawa | A63F 13/655 345/633 |
| 2012/0218300 A1* | 8/2012 | Hayakawa | A63F 13/06 345/633 |
| 2012/0268491 A1* | 10/2012 | Sugden | G06T 13/80 345/633 |
| 2012/0287159 A1* | 11/2012 | Bett | G06F 3/005 345/633 |
| 2013/0084012 A1* | 4/2013 | Murphy | G06T 19/006 382/190 |
| 2013/0100165 A1* | 4/2013 | Komiyama | G09G 5/397 345/634 |
| 2013/0222424 A1* | 8/2013 | Morinaga | G06T 19/006 345/629 |
| 2014/0125701 A1* | 5/2014 | Hayakawa | A63F 13/525 345/633 |
| 2014/0270477 A1* | 9/2014 | Coon | G06T 19/006 382/154 |
| 2014/0368426 A1* | 12/2014 | Umehara | G06F 3/01 345/156 |
| 2015/0070347 A1* | 3/2015 | Hofmann | G06K 9/00208 345/419 |
| 2015/0228123 A1* | 8/2015 | Yasutake | G06T 19/006 345/633 |
| 2015/0363076 A1* | 12/2015 | Komatsu | G06T 19/006 715/765 |
| 2015/0363647 A1* | 12/2015 | Perez | G06K 9/00671 345/633 |

\* cited by examiner

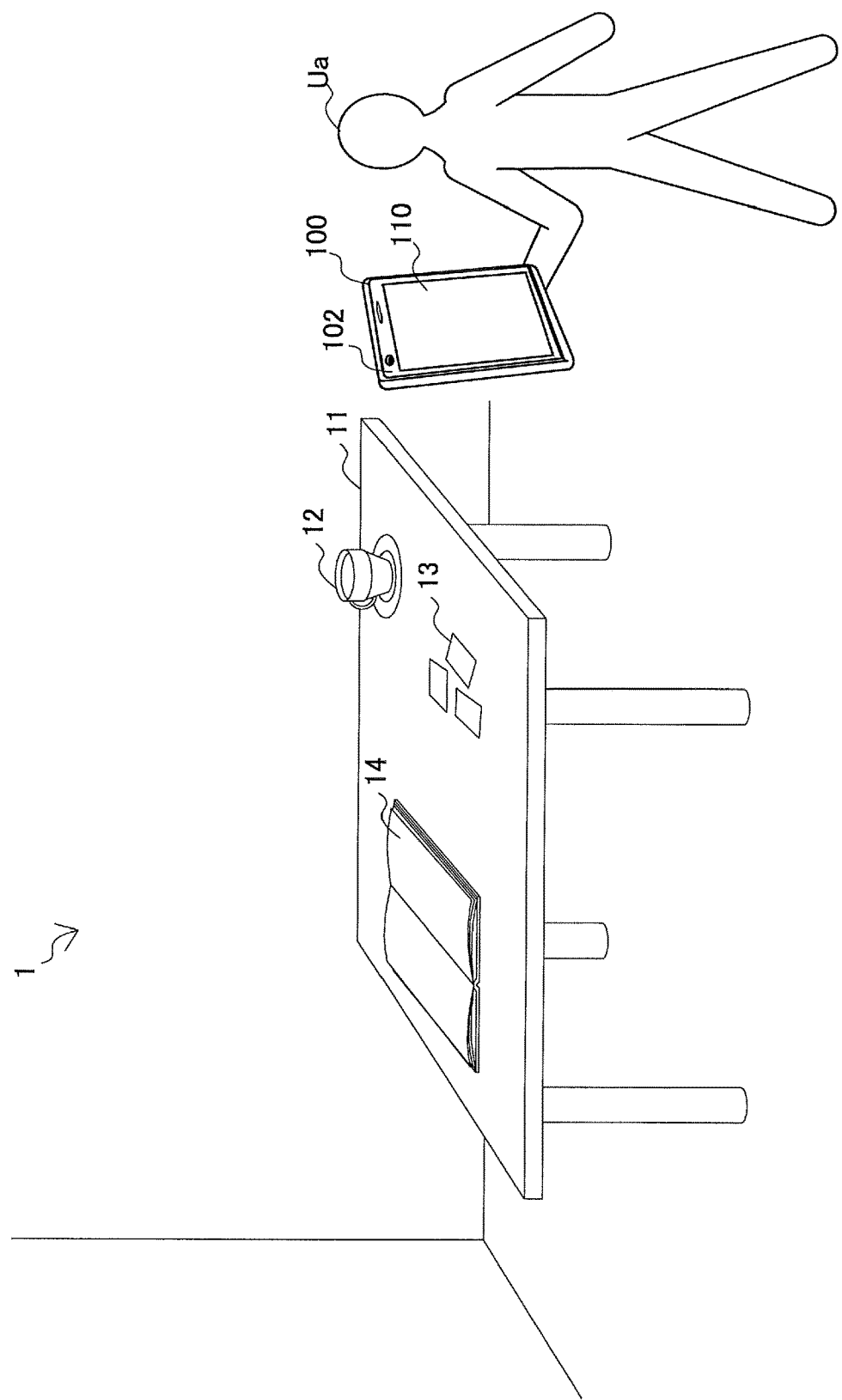

REAL OBJECT → AR OBJECT

REAL OBJECT → AR OBJECT

REAL OBJECT    AR OBJECT

REAL OBJECT    AR OBJECT

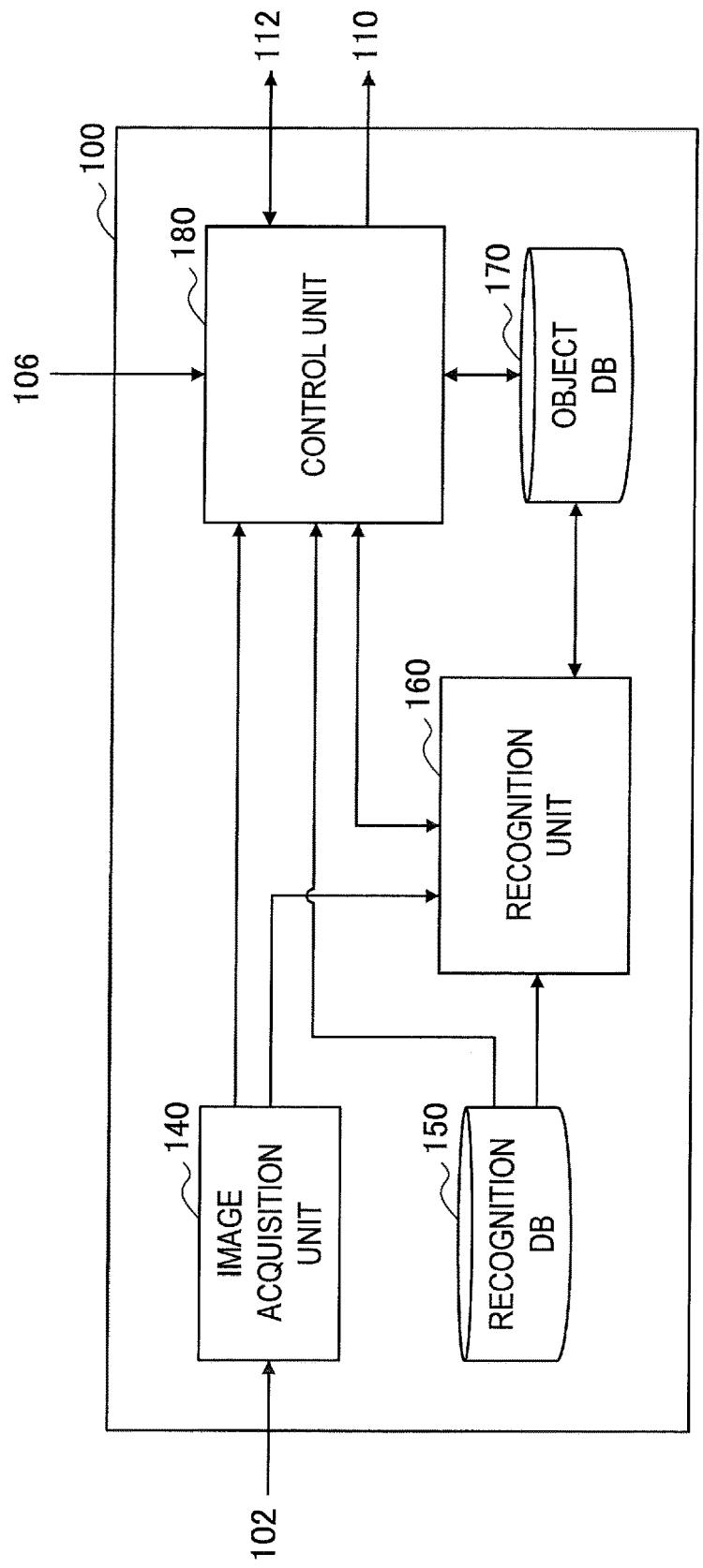

FIG.10

| PRIMARY CODE ID | SECONDARY CODE VALUE | OBJECT ID | POSITION | ATTITUDE | GRAPHIC DATA |
|---|---|---|---|---|---|
| PC1 | 000 | AR10 | X11 | W11 | H11 |
|  | ⋮ | ⋮ | ⋮ | ⋮ | ⋮ |
|  | 101 | AR15 | X15 | W15 | H15 |
|  | ⋮ | ⋮ | ⋮ | ⋮ | ⋮ |
| PC2 | SC21 | AR21 | X21 | W21 | H21 |
|  | ⋮ | ⋮ | ⋮ | ⋮ | ⋮ |

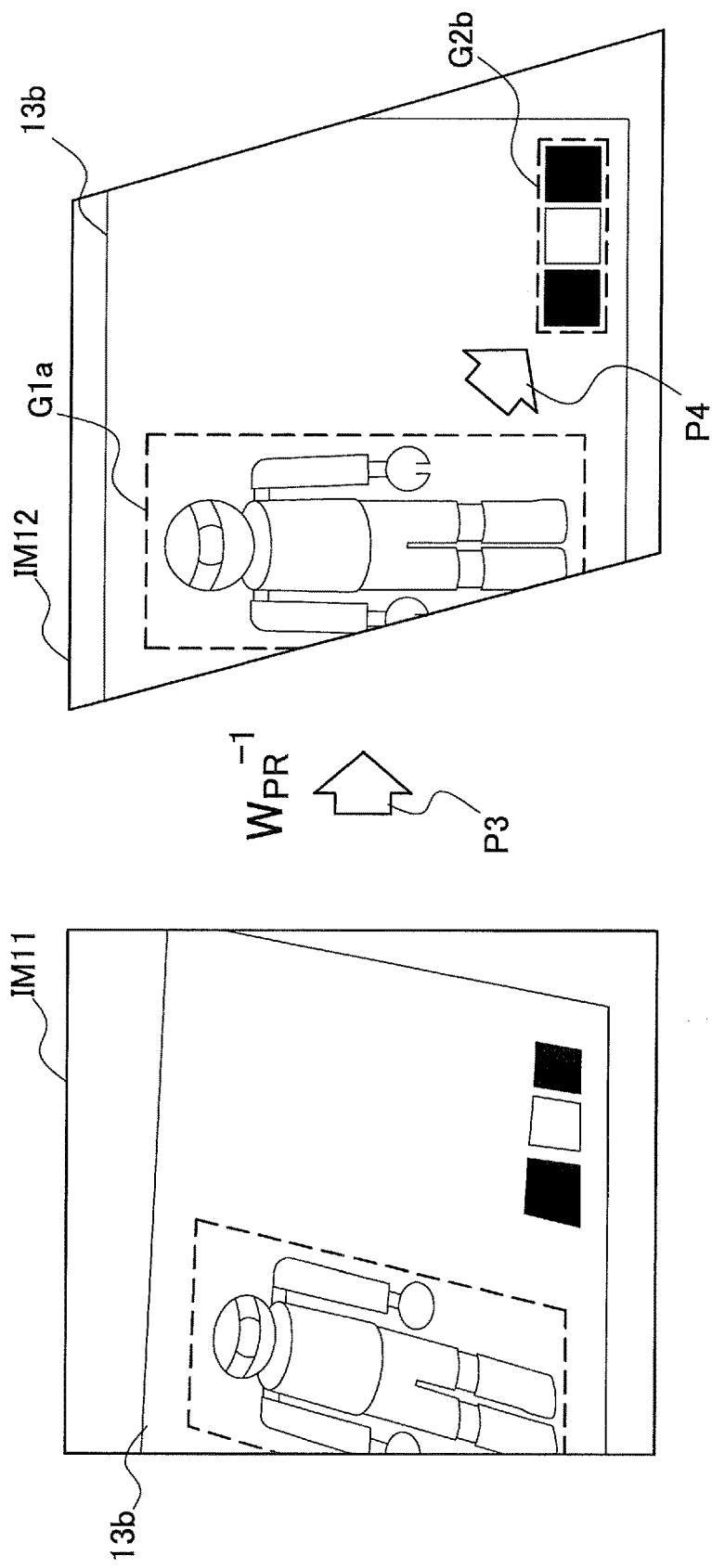

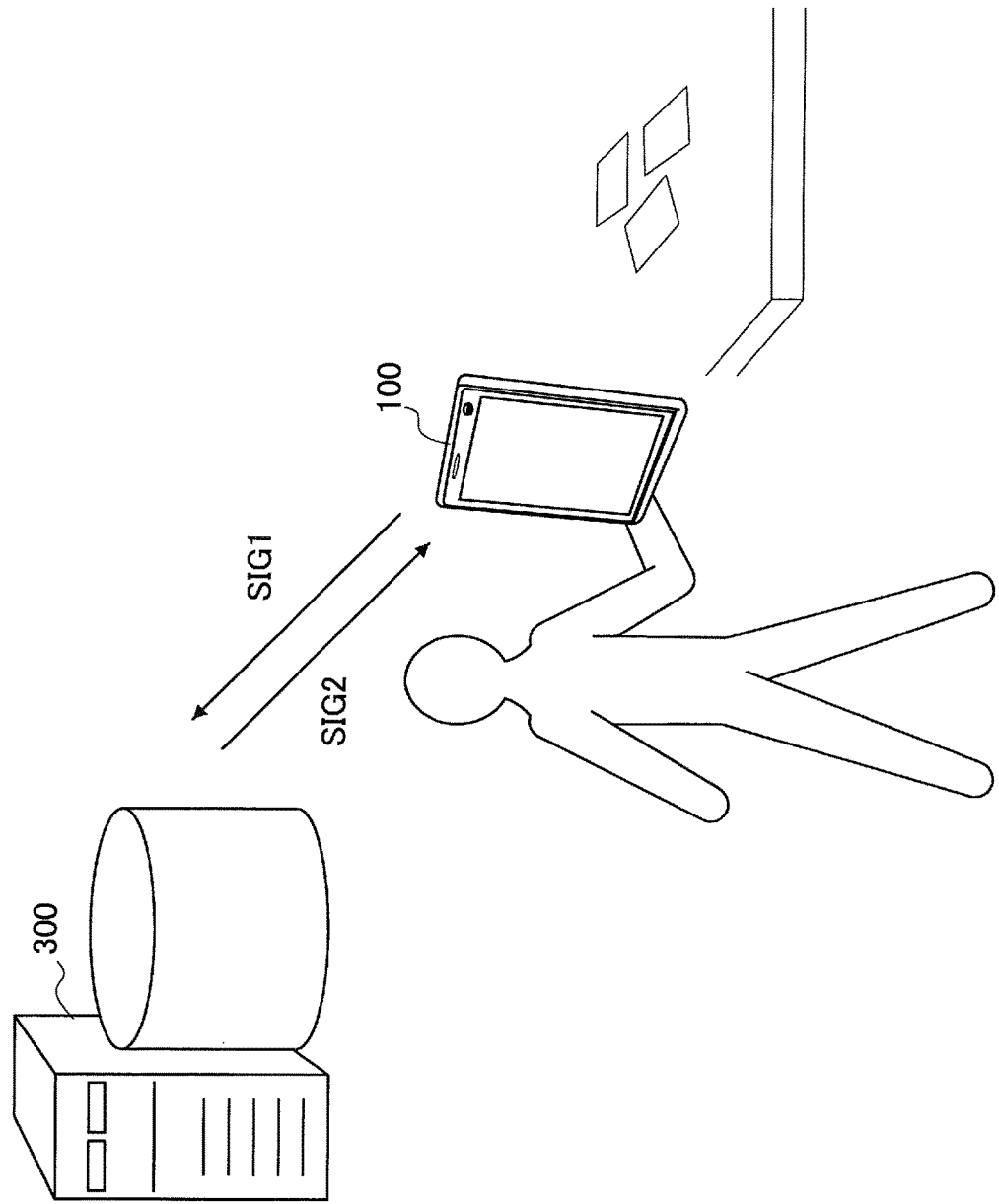

IMAGE PROCESSING TO ENHANCE VARIETY OF DISPLAYABLE AUGMENTED REALITY OBJECTS

CROSS REFERENCE TO RELATED APPLICATIONS

This application claims the benefit of Japanese Priority Patent Application JP 2013-126616 filed Jun. 17, 2013, the entire contents of which are incorporated herein by reference.

BACKGROUND

The present disclosure relates to an image processing apparatus, an image processing method, a program, a print medium, and a print-media set.

An augmented reality (AR) technology which has received attention in recent years arranges a virtual object (AR object) in an AR space associated with an image in which a real space is shown, and causes an image of the arranged AR object and an image of the real space to be displayed together on a screen. Accordingly, on the screen, a user is provided with an experience that a user feels like the AR object exists in the real space. The AR object to be displayed is fixedly defined in advance or is selected depending on the kind of the imaged real object.

For example, JP 2013-092964A discloses an AR application for arranging, in an AR space, an AR object representing an animal shown on a captured image when a picture book illustrating animals is imaged. In the AR application, feature amounts of known images of animals corresponding to respective AR objects are registered in a database in advance. Subsequently, as a result of matching of feature amounts of the captured image against feature amounts of known images, it is decided which animal is shown in the captured image, and which animal's AR object is displayed.

SUMMARY the more diverse the displayed AR objects are, the more attractive the AR application is. However, in order to enhance variety of the AR objects, many kinds of real objects have to be recognized. Accordingly, feature data to be matched against increases, and a large processing cost is necessary. For this reason, in the existing methods, the restriction on processing resource prevents variety of AR objects from increasing.

It is desirable to provide a mechanism that can suppresses increase in the processing cost and can enhance variety of displayable AR objects.

According to an embodiment of the present disclosure, there is provided an image processing apparatus including an image acquisition unit configured to acquire an image that shows a real object including a primary recognition target and a secondary recognition target, and a control unit configured to set an augmented reality space associated with the image on the basis of image recognition of the primary recognition target, and configured to decide an augmented reality object to be arranged in the augmented reality space depending on the secondary recognition target that is recognized on the basis of the image recognition of the primary recognition target.

According to an embodiment of the present disclosure, there is provided an image processing method including acquiring an image that shows a real object including a primary recognition target and a secondary recognition target, setting an augmented reality space associated with the image on the basis of image recognition of the primary recognition target, and deciding an augmented reality object to be arranged in the set augmented reality space depending on the secondary recognition target that is recognized on the basis of the image recognition of the primary recognition target.

According to an embodiment of the present disclosure, there is provided a program for causing a computer which controls an image processing apparatus to function as an image acquisition unit configured to acquire an image that shows a real object including a primary recognition target and a secondary recognition target, and a control unit configured to set an augmented reality space associated with the image on the basis of image recognition of the primary recognition target, and configured to decide an augmented reality object to be arranged in the augmented reality space depending on the secondary recognition target that is recognized on the basis of the image recognition of the primary recognition target.

According to an embodiment of the present disclosure, there is provided a print medium including a print surface, the print medium including a primary recognition target that is printed on the print surface and that is used for associating an image showing the print medium with an augmented reality space, and one of a secondary recognition target and an edit area for the secondary recognition target, which are printed on the print surface and which are used for deciding an augmented reality object to be arranged in the augmented reality space.

According to an embodiment of the present disclosure, there is provided a print-media set including a plurality of the print media. Two or more of the print media respectively include the primary recognition target having a common appearance and the secondary recognition target in which a different value is encoded.

According to embodiments of the present disclosure, increase of the processing cost can be suppressed, and variety of displayable AR objects can be enhanced.

BRIEF DESCRIPTION OF THE DRAWINGS

FIG. 1 is an explanatory diagram illustrating an overview of an image processing system according to an embodiment;

FIG. 7 is a block diagram showing an example of a configuration of logical functions of an image processing apparatus according to an embodiment;

FIG. 10 is an explanatory diagram showing an example of a configuration of object data;

FIG. 11B is an explanatory diagram illustrating an example of recognition of a secondary recognition target;

FIG. 17 is an explanatory diagram illustrating a collaboration of a plurality of apparatuses.

DETAILED DESCRIPTION OF THE EMBODIMENT(S)

Figure 2A:
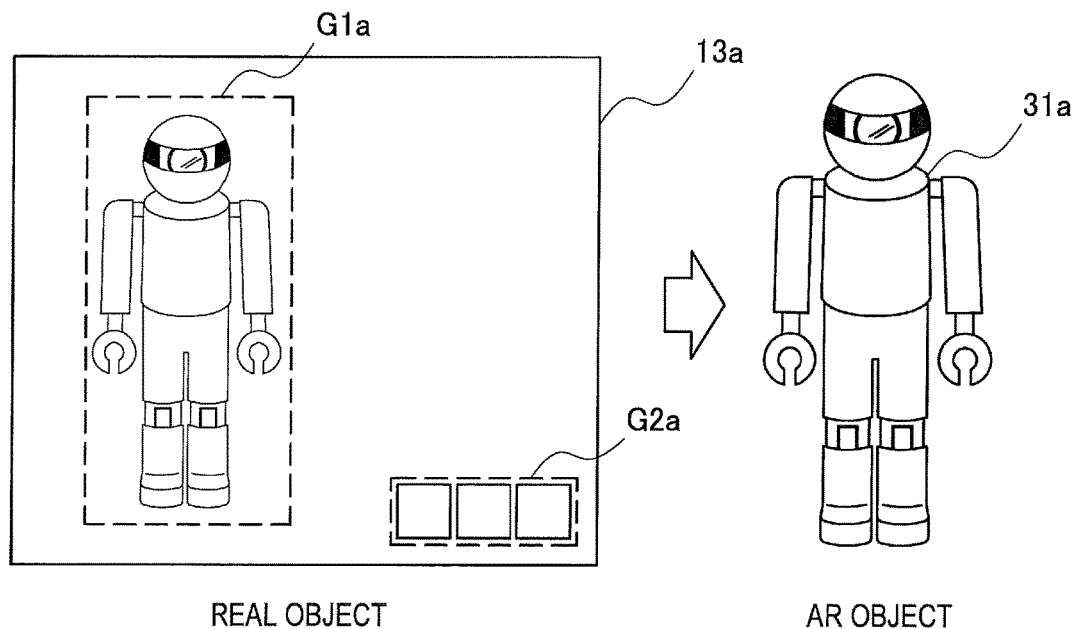
FIG. 2A is a first explanatory diagram illustrating a first example of a pair of a primary recognition target and a secondary recognition target.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be provided in the following order:
1. Overview
1-1. Perspective of System
1-2. Example of Recognition Target
2. Configuration Example of Image Processing Apparatus
2-1. Hardware Configuration
2-2. Functional Configuration
2-3. Flow of Processing
3. Application Example
3-1. Example of Real Object
3-2. Use of HMD
3-3. Collaboration of Plurality of Apparatuses
4. Conclusion

1. OVERVIEW

First, by using FIGS. 1 to 5, there will be explained an overview of an image processing system according to an embodiment of the present disclosure.

1-1. Perspective of System

FIG. 1 is an explanatory diagram illustrating an overview of an image processing system according to an embodiment of the present disclosure. With reference to FIG. 1, there is shown an image processing apparatus 100 held by a user Au. The image processing apparatus 100 includes a camera 102 and a display 110, the camera 102 imaging a real space 1. As shown in the example of FIG. 1, a table 11, a coffee cup 12, a card set 13, and a book 14 exist in the real space 1. The camera 102 of the image processing apparatus 100 images such real space 1 and generates a series images constituting a video image which shows real objects in the real space 1. Subsequently, the image processing apparatus 100 performs image processing using a captured image generated by the camera 102 as an input image, and generates an output image. In this embodiment, the output image is typically generated by overlaying an AR object on the input image. The display 110 of the image processing apparatus 100 sequentially displays generated output images. Note that the real space 1 shown in FIG. 1 is merely an example. The image processing apparatus 100 can process images showing any real objects.

FIG. 1 shows a smartphone as an example of the image processing apparatus 100. However, the image processing apparatus 100 is not limited thereto. For example, the image processing apparatus 100 may be a mobile device such as a tablet computer, a laptop, a portable game console, a portable navigation device (PND), or a digital camera. The image processing apparatus 100 may also be a wearable device such as a head-mounted display (HMD) device.

1-2. Example of Recognition Target

In an embodiment of the present disclosure, an image showing a real object having a primary recognition target and a secondary recognition target is acquired as an input image for an AR application. The primary recognition target is recognized by the image processing apparatus 100 so as to calculate a relative arrangement of the real object to an imaging surface. In the present specification, the term "arrangement" includes at least one of a position (parallel shift), an attitude (rotation), and a size (scaling) with regard to a two-dimensional or three-dimensional coordinate system. On the basis of image recognition of the primary recognition target, an AR space is set in association with the input image. The secondary recognition target is recognized by the image processing apparatus 100 on the basis of the image recognition of the primary recognition target. The AR object to be arranged in the AR space is decided depending on the recognized secondary recognition target.

(1) First Example

Figure 2B:
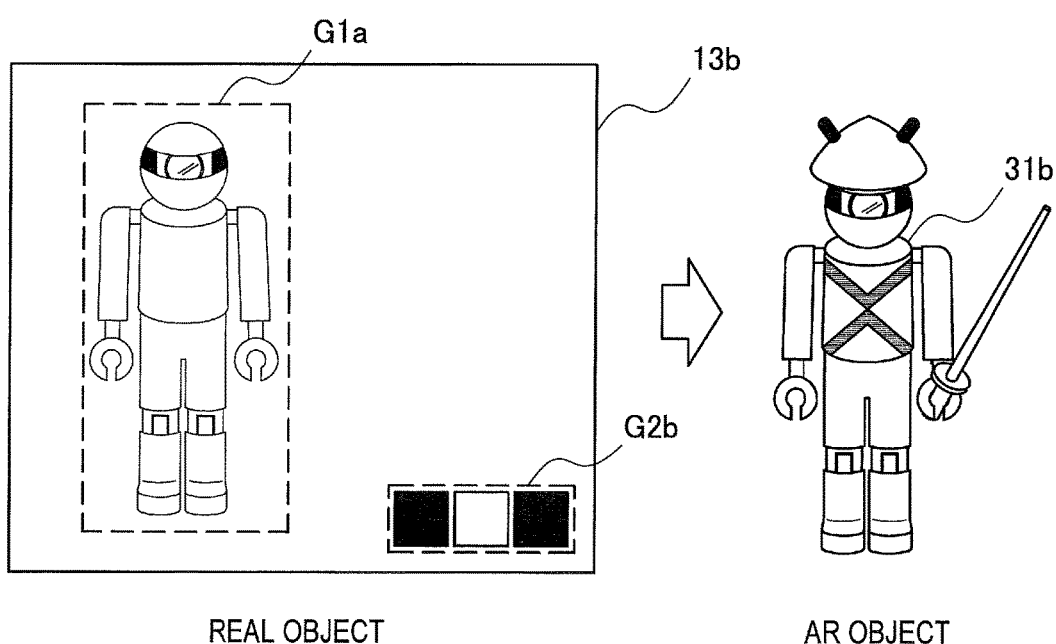
FIG. 2B is a second explanatory diagram illustrating a first example of a pair of a primary recognition target and a secondary recognition target.

FIGS. 2A and 2B are explanatory diagrams illustrating a first example of a pair of a primary recognition target and a secondary recognition target. In the first example, the primary recognition target is a design (so-called natural marker) having a role of a marker. The secondary recognition target is a visible code. The primary recognition target and the secondary recognition target are printed on a print surface of a card which is the real object. The relative arrangement of the secondary recognition target to the primary recognition target is fixedly defined in advance.

in the left-hand side of FIG. 2A, a card 13a included in the card set 13 is shown. A primary recognition target G1a and a secondary recognition target G2a are printed on a print surface of the card 13a. The primary recognition target G1a is a design representing an appearance of a robot-type character. The secondary recognition target G2a is a visible code having three rectangular fields. In the example of FIG.

2A, all the three fields are blank. For example, the image processing apparatus 100 matches a plurality of feature points extracted from the input image showing the card 13*a*, against a set of feature points of a known image of the primary recognition target G1a. Accordingly, the image processing apparatus 100 can recognize how the primary recognition target G1a is arranged and shown in the input image. In addition, the image processing apparatus 100 performs recognition processing on the secondary recognition target G2a, and recognizes a code value of the secondary recognition target G2a. Next, the image processing apparatus 100 arranges, in the AR space, an AR object corresponding to the recognized code value. In the example of FIG. 2A, a character 31*a* is decided as the AR object to be arranged in the AR space.

in the left-hand side of FIG. 2B, a card 13*b* included in the card set 13 is shown. The primary recognition target G1a and a secondary recognition target G2b are printed on a print surface of the card 13*b*. Since the primary recognition target G1a has a common appearance between the card 13*a* and the card 13*b*, the image processing apparatus 100 can recognize an arrangement of the card 13*a* in the input image by using a single set of feature points, and can also recognize an arrangement of the card 13*b* in the input image by using the single set of feature points. As with the secondary recognition target G2a shown in FIG. 2A, the secondary recognition target G2b is a visible code having three rectangular fields. In the example of FIG. 2B, two out of three fields are filled. The image processing apparatus 100 performs recognition processing on the secondary recognition target G2b, and recognizes a code value of the secondary recognition target G2b. Next, the image processing apparatus 100 arranges, in an AR space, an AR object corresponding to the recognized code value. In the example of FIG. 2B, a character 31*b* is decided as the AR object to be arranged in the AR space.

(2) Second Example

Figure 3A:
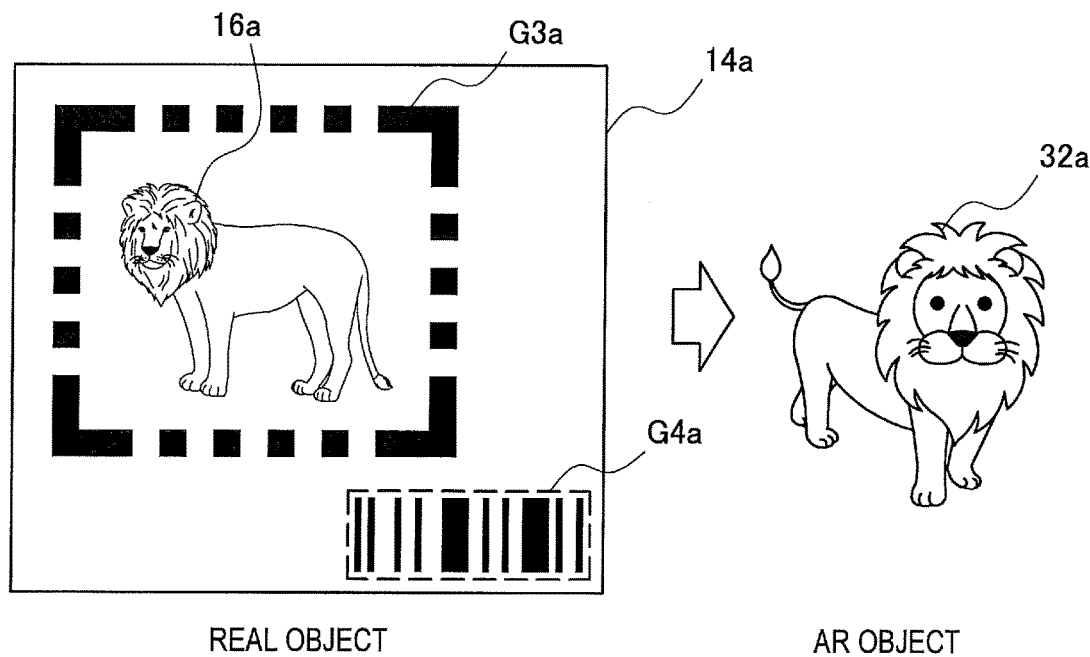
FIG. 3A is a first explanatory diagram illustrating a second example of a pair of a primary recognition target and a secondary recognition target.
Figure 3B:
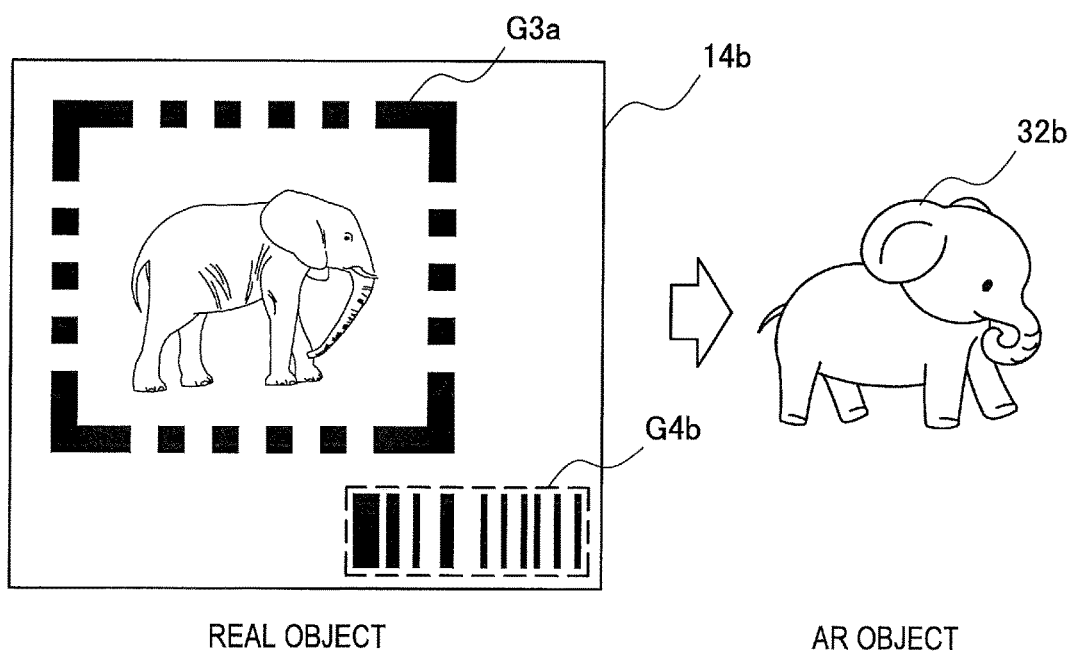
FIG. 3B is a second explanatory diagram illustrating a second example of a pair of a primary recognition target and a secondary recognition target.

FIGS. 3A and 3B are explanatory diagrams illustrating a second example of a pair of a primary recognition target and a secondary recognition target. In the second example, a primary recognition target is a patterned figure (so-called artificial marker). The secondary recognition target is a visible code. The primary recognition target and the secondary recognition target are printed on a print surface of a book which is the real object. The relative arrangement of the secondary recognition target to the primary recognition target is fixedly defined in advance.

in the left-hand side of FIG. 3A, a page 14*a* of the book 14 is shown. A primary recognition target G3a and a secondary recognition target G4a are printed on a print surface of the page 14*a*. The primary recognition target G3a is a frame surrounding a design 16*a* in which a lion is painted. The secondary recognition target G4a is a bar code. For example, the image processing apparatus 100 can detect a known pattern regarding the primary recognition target G3a from an input image showing the page 14*a*, and can recognize, on the basis of a shape and a size of the detected pattern, how the primary recognition target G3a is arranged and shown in the input image. In addition, the image processing apparatus 100 performs recognition processing on the secondary recognition target G4a (in other word, scans the bar cord), and recognizes a code value of the secondary recognition target G4a. Next, the image processing apparatus 100 arranges, in an AR space, an AR object corresponding to the recognized code value. In the example of FIG. 3A, a character 32*a* is decided as the AR object to be arranged in the AR space.

in the left-hand side of FIG. 3B, a page 14*b* of the book 14 is shown. The primary recognition target G3a and a secondary recognition target G4b are printed on a print surface of the page 14*b*. Since the primary recognition target G3a has a common appearance between the page 14*a* and the page 14*b*, the image processing apparatus 100 can recognize an arrangement of the page 14*a* in the input image by using a single known pattern, and can also recognize an arrangement of the page 14*b* in the input image by using the single known pattern. As with the secondary recognition target G4a shown in FIG. 3A, the secondary recognition target G4b is a bar code. The image processing apparatus 100 performs recognition processing on the secondary recognition target G4b (in other word, scans the bar cord), and recognizes a code value of the secondary recognition target G4b. Next, the image processing apparatus 100 arranges, in an AR space, an AR object corresponding to the recognized code value. In the example of FIG. 3B, a character 32*b* is decided as the AR object to be arranged in the AR space.

A marker used as a primary recognition target is not limited to the examples shown in FIGS. 2A to 3B. The marker may be any figure, symbol, character string, or design, or a combination thereof. As the primary recognition target, a two-dimensional code such as Cyber Code (registered trademark) can be used, for example.

(3) Editing of Secondary Recognition Target Performed by User

Figure 4A:
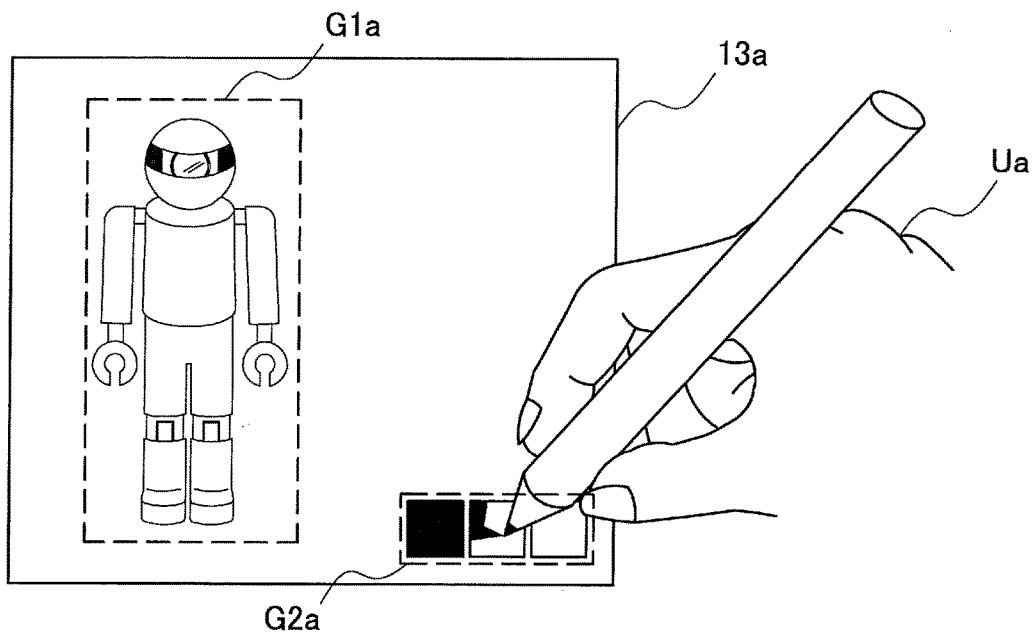
FIG. 4A is an explanatory diagram illustrating a first example of editing of a secondary recognition target performed by a user.

A code of a secondary recognition target may be editable by a user. FIG. 4A is an explanatory diagram illustrating a first example of editing of a secondary recognition target performed by a user. FIG. 4A again shows the card 13*a* of FIG. 2A. In the first example, the user Au fills the fields of the secondary recognition target G2a using a pen, and rewrites the code value of the secondary recognition target G2a.

Figure 4B:
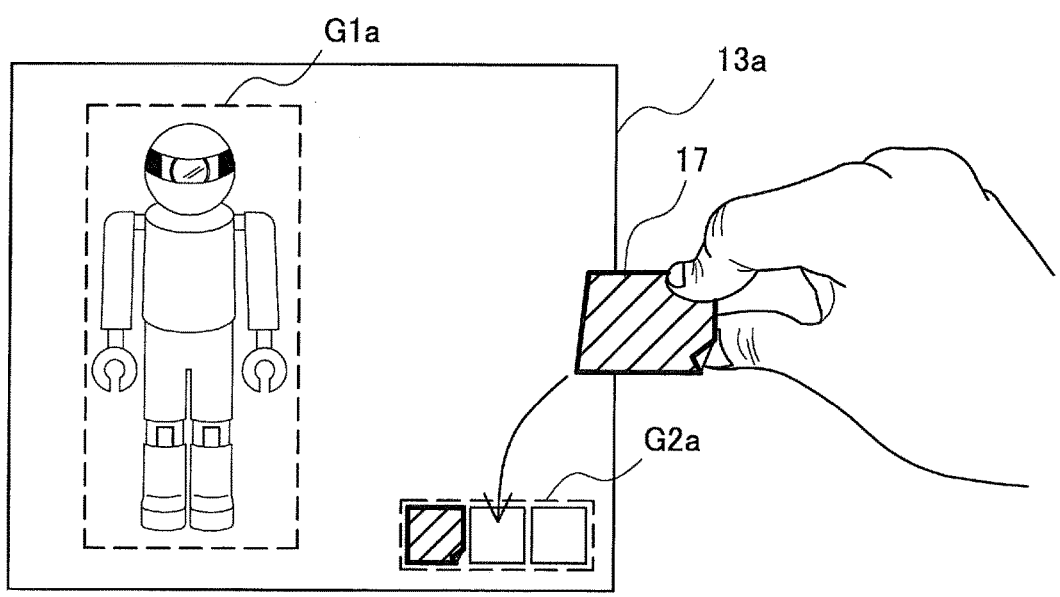
FIG. 4B is an explanatory diagram illustrating a second example of editing of a secondary recognition target performed by a user.

FIG. 4B is an explanatory diagram illustrating a second example of editing of a secondary recognition target performed by a user. FIG. 4B again shows the card 13*a* of FIG. 2A. In the second example, the user Ua puts a sticker 17 on a field of the secondary recognition target G2a, and rewrites the code value of the secondary recognition target G2a.

With regard to the examples of FIGS. 4A and 4B, when the recognition processing is performed on the edited secondary recognition target G2a, different code values are recognized depending on how the secondary recognition target G2a was edited. In response to the recognition, the AR object arranged in the AR space is changed. For example, in the case where a secondary recognition target has three fields, the fields each being black or white, 8 ($=2^3$) different AR objects can be recognized. The number of fields may be any number as long as the number is larger than or equal to one. The fields may have three or more colors. On the other hand, the primary recognition target G1a of the card 13*a* is common to the two examples. Accordingly, the image processing apparatus 100 matches only the single set of feature points of the primary recognition target G1a against feature points extracted from the input image so as to calculate an arrangement of the card 13*a* shown in the input image.

(4) Composite Secondary Recognition Target

A single real object may include a composite secondary recognition target constituted from a plurality of parts. FIG.

Figure 5:
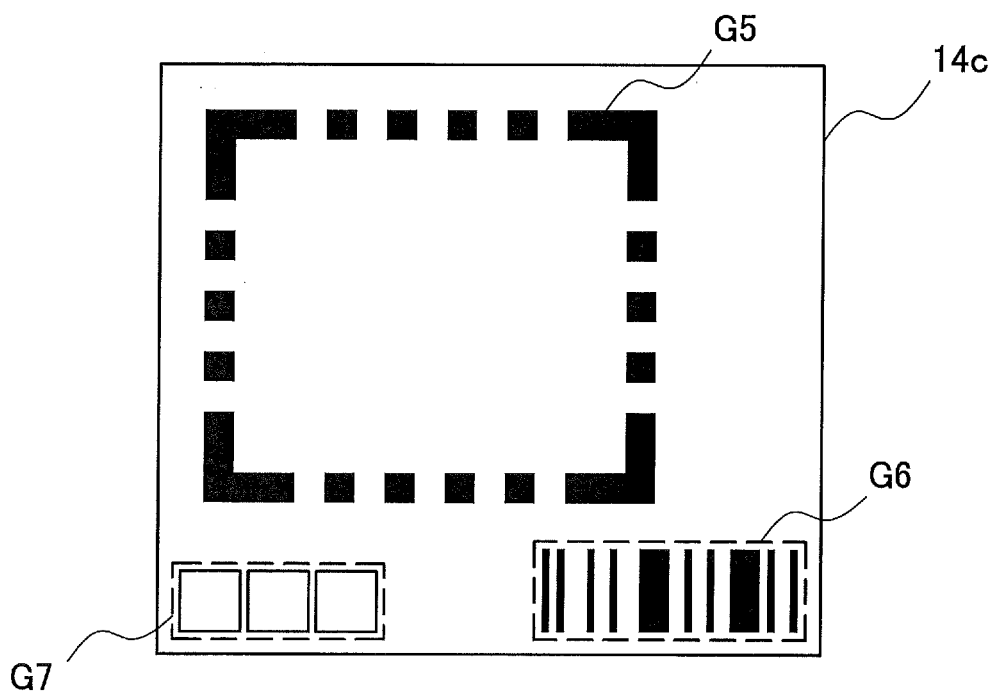
FIG. 5 is an explanatory diagram illustrating an example of a composite secondary recognition target.

5 is an explanatory diagram illustrating an example of a composite secondary recognition target. With reference to FIG. 5, a real object 14c includes a primary recognition target G5, a secondary recognition target G6, and an edit area G7 for the secondary recognition target. The primary recognition target G5 is a frame having a role of an artificial marker. In the frame, any kinds of content may be printed. The secondary recognition target G6 is a bar code in which a given code value is encoded in advance. The edit area G7 may include a different code value depending on an editing performed by a user. A relative arrangement of the secondary recognition target G6 and the edit area G7 to the primary recognition target G5 is defined in advance. The image processing apparatus 100 may set an AR space on the basis of image recognition of the primary recognition target G5, and may determine an AR object to be arranged in the AR space depending on a combination of a code value recognized from the secondary recognition target G6 and a code value recognized from the edited edit area G7.

According to the mechanism explained in this section, increase of the processing cost of image recognition which is necessary for setting an AR space is suppressed, and variety of AR objects to be displayed can be enhanced. In the next section, there will be explained an example of specific configuration of an image processing apparatus 100 achieving such mechanism.

2. CONFIGURATION EXAMPLE OF IMAGE PROCESSING APPARATUS

2-1. Hardware Configuration

Figure 6:
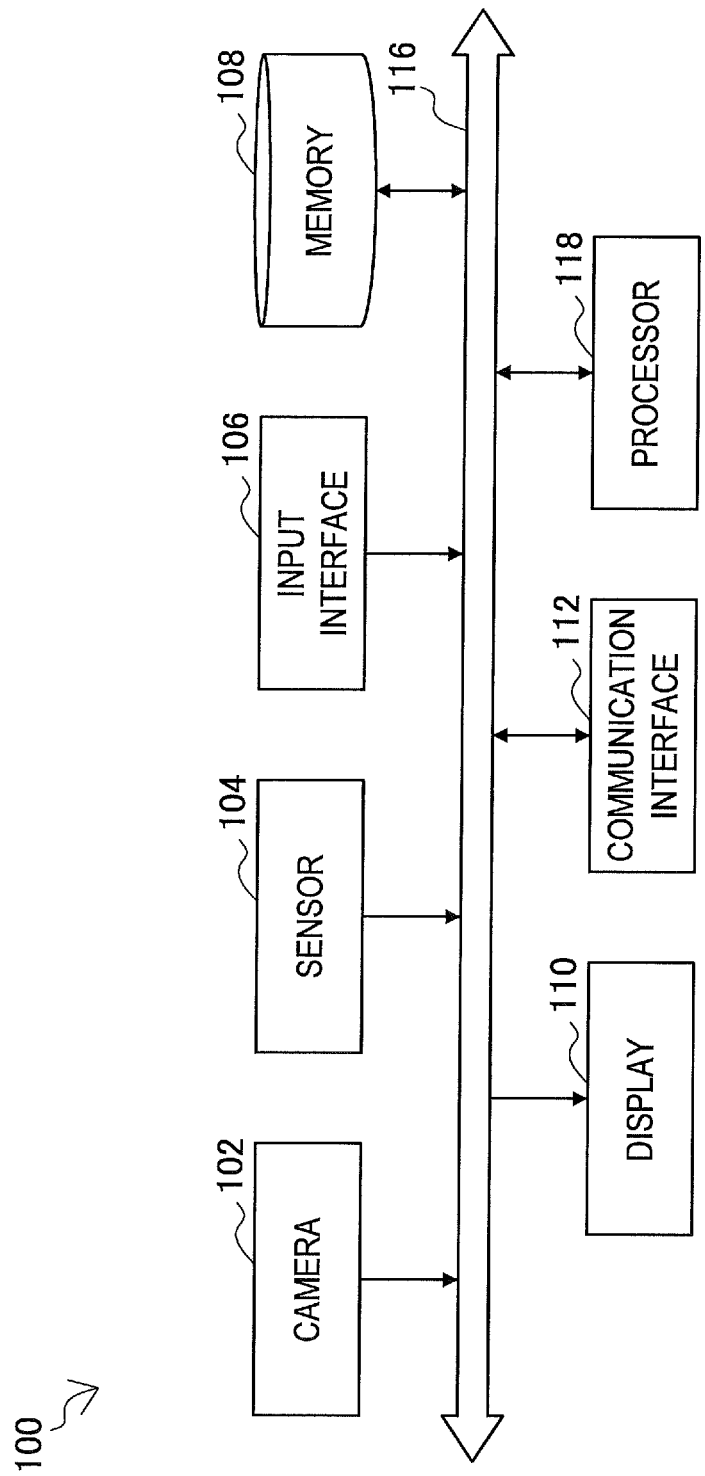
FIG. 6 is a block diagram showing an example of a hardware configuration of an image processing apparatus according to an embodiment.

FIG. 6 is a block diagram showing an example of a hardware configuration of an image processing apparatus 100 according to an embodiment. Referring to FIG. 6, the image processing apparatus 100 includes a camera 102, a sensor 104, an input interface 106, memory 108, a display 110, a communication interface 112, a bus 116, and a processor 118.

(1) Camera

The camera 102 is a camera module that captures an image. The camera 102 images a real object using an image sensor such as a charge coupled device (CCD) or a complementary metal oxide semiconductor (CMOS) to generate a captured image. A series of captured images generated by the camera 102 configures a video image.

(2) Sensor

The sensor 104 may include a variety of sensors such as a positioning sensor, an acceleration sensor, and a gyrosensor. The position, attitude, or movement of the image processing apparatus 100 that can be measured by the sensor 104 may be used for a variety of purposes such as supporting recognition of the position and attitude of a camera, described later, acquisition of data that specifies a global position, or recognition of instructions from the user. Note that the sensor 104 may be omitted from the configuration of the image processing apparatus 100.

(3) Input Interface

The input interface 106 is an input device used by a user for operating the image processing apparatus 100 or for inputting information into the image processing apparatus 100. For example, the input interface 106 may include a touch sensor that detects touches made by the user on a screen of the display 110. In addition, the input interface 106 may include an input device such as a keyboard, a keypad, a button, or a switch. The input interface 106 may also include a microphone for voice input and a voice recognition module.

(4) Memory

The memory 108 is a storage medium such as semiconductor memory or a hard disk drive. The memory 108 stores programs and data for processing performed by the image processing apparatus 100. For example, the data stored by the memory 108 may include captured image data, sensor data, and data in a variety of databases (DB), described later. Note that instead of being stored in the memory 108, some of the programs and data described in the present specification may be acquired from an external data source (as examples, a data server, network storage, or external memory).

(5) Display

The display 110 is a display module including a display to show images. For example, the display 110 may be a liquid crystal display (LCD), an organic light-emitting diode (OLED), a cathode ray tube (CRT), or the like. For example, the display 110 displays an output image in which an AR object is overlaid, the AR object being generated by the image processing apparatus 100.

(6) Communication Interface

The communication interface 112 is a communication interface that serves as a mediator for communication by the image processing apparatus 100 with another apparatus. The communication interface 112 supports an arbitrary wireless communication protocol or wired communication protocol and establishes a communication connection with the other apparatus.

(7) Bus

The bus 116 connects the camera 102, the sensor 104, the input interface 106, the memory 108, the display 110, the communication interface 112, and the processor 118 to one another.

(8) Processor

The processor 118 corresponds to a processor such as a central processing unit (CPU) or a digital signal processor (DSP). By executing a program stored in the memory 108 or another storage medium, the control unit 118 causes the image processing apparatus 100 to function in a variety of ways as described later.

2-2. Functional Configuration

FIG. 7 is a block diagram showing an example of a logical functional configuration achieved by the memory 108 and the processor 118 of the image processing apparatus 100 shown in FIG. 6. As shown in FIG. 7, the image processing apparatus 100 includes an image acquisition unit 140, a recognition database (DB) 150, a recognition unit 160, an object DB 170, and a control unit 180.

(1) Image Acquisition Unit

The image acquisition unit 140 acquires an image captured by the camera 102 as an input image. Typically, the input image is each of the frames in the series of frames configuring the video. In this embodiment, the input image is an image in which a real object including a primary recognition target and a secondary recognition target is shown. Subsequently, the image acquisition unit 140 outputs the acquired input image to the recognition unit 160 and the control unit 180.

(2) Recognition DB

The recognition DB 150 is a database storing recognition dictionary data used by the recognition unit 160, described later. For example, the recognition dictionary data includes feature data that defines features of primary recognition targets with respect to each one or more primary recognition targets. The recognition dictionary data also includes arrangement data that defines a relative arrangement of a secondary recognition target to a primary recognition target.

Figure 8A:
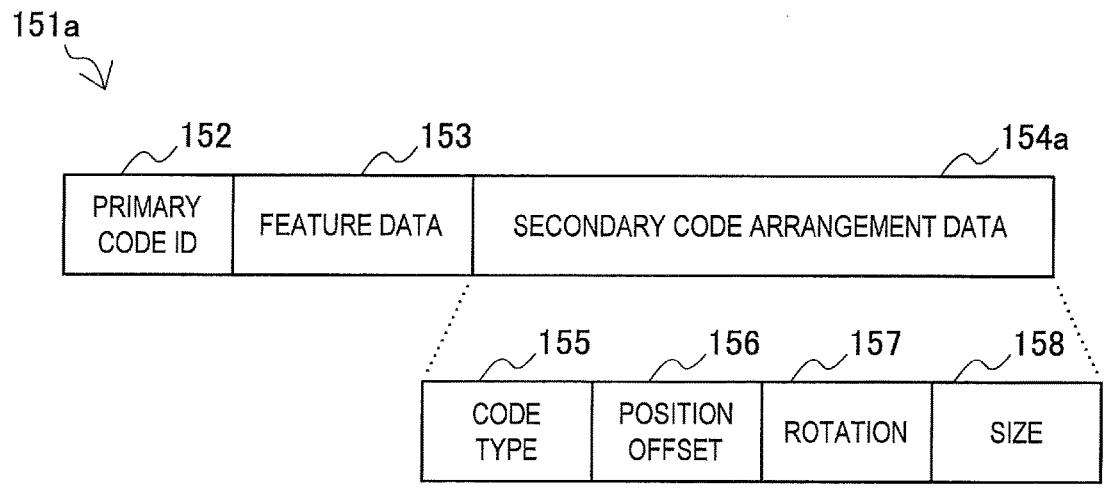
FIG. 8A is an explanatory diagram showing a first example of a configuration of recognition dictionary data.
Figure 9:
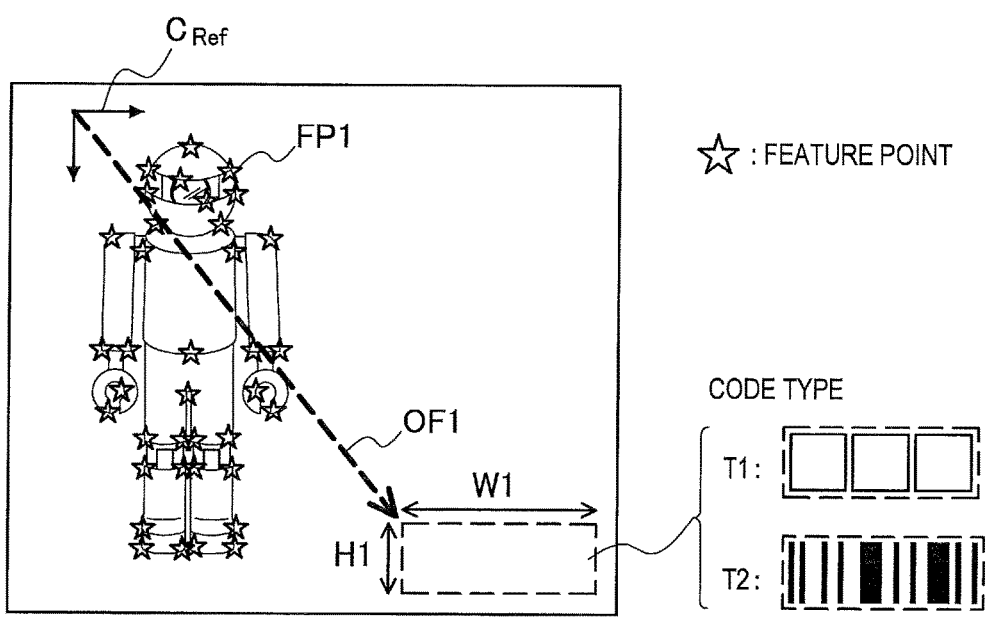
FIG. 9 is an explanatory diagram illustrating meanings of data items of recognition dictionary data.

FIG. 8A is an explanatory diagram showing a first example of a configuration of recognition dictionary data which may be stored in the recognition DB 150. As shown in FIG. 8A, recognition dictionary data 151*a* includes a primary code ID 152, feature data 153, and secondary code arrangement data 154*a*. The secondary code arrangement data 154*a* includes a code type 155, a position offset 156, a rotation 157, and a size 158. With reference to FIG. 9, a meaning of each data item in the recognition dictionary data 151*a* will be described below.

The primary code ID 152 is an identifier for uniquely identifying a primary recognition target. The feature data 153 defines known features of each primary recognition target. In the case where the primary recognition target is the design shown in FIGS. 2A and 2B, the feature data 153 may define a set of feature points that is extracted from the known image of the design in advance. For example, the set of feature points may include position coordinates and brightness of the feature points, the position coordinates being position coordinates of each of the plurality of the feature points in a two-dimensional coordinate system on a print surface of a real object. Referring to FIG. 9, stars represent positions of the plurality of feature points including a feature point FP1 in a two-dimensional coordinate system $C_{ref}$. In the case where the primary recognition target is a patterned figure as shown in FIGS. 3A and 3B, the feature data 153 may define a shape and a size of a known pattern.

The code type 155 defines a type of a secondary recognition target. With reference to FIG. 9, two kinds of code types T1 and T2 are shown. The code type T1 shows that a secondary recognition target is a code including three rectangular fields being abreast of each other. The code type T2 shows that a secondary recognition target is a bar code. Both two codes are visible codes. The position offset 156 defines an offset from a reference position (for example, the origin of the two-dimensional coordinate system $C_{ref}$) of the primary recognition target to a reference position of the secondary recognition target. In FIG. 9, the position offset 156 is equal to position coordinates OF1 representing an upper left vertex of a bounding box surrounding the secondary recognition target. The rotation 157 defines a rotation amount (for example, a rotation amount of a real object on a print surface) of the secondary recognition target around the reference position. In the example of FIG. 9, the rotation 157 may be omitted because the secondary recognition target is not rotated. The size 158 defines a size of the secondary recognition target in the two-dimensional coordinate system $C_{ref}$. In the example of FIG. 9, the size 158 indicates a width W1 and a height H1 of the bounding box surrounding the secondary recognition target.

Figure 8B:
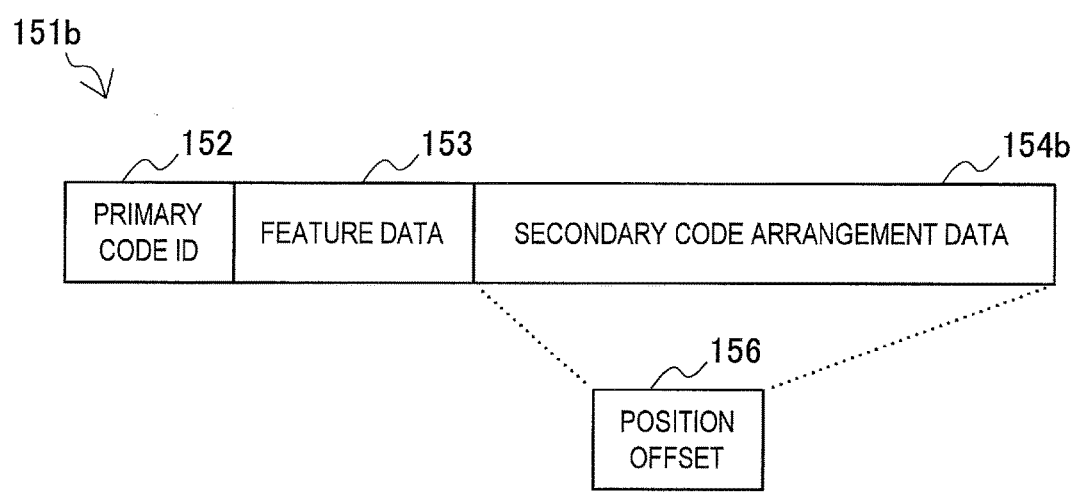
FIG. 8B is an explanatory diagram showing a second example of a configuration of recognition dictionary data.

FIG. 8B is an explanatory diagram showing a second example of recognition dictionary data which may be stored in the recognition DB 150. As shown in FIG. 8B, recognition dictionary data 151*b* includes a primary code ID 152, feature data 153, and secondary code arrangement data 154*b*. The secondary code arrangement data 154*b* includes a position offset 156 only. For example, in the case where there is only a single type of the secondary recognition target and the secondary recognition target is not rotated and the size of the secondary recognition target is fixed, a relative arrangement of the secondary recognition target can be defined simply as described herein.

Figure 8C:
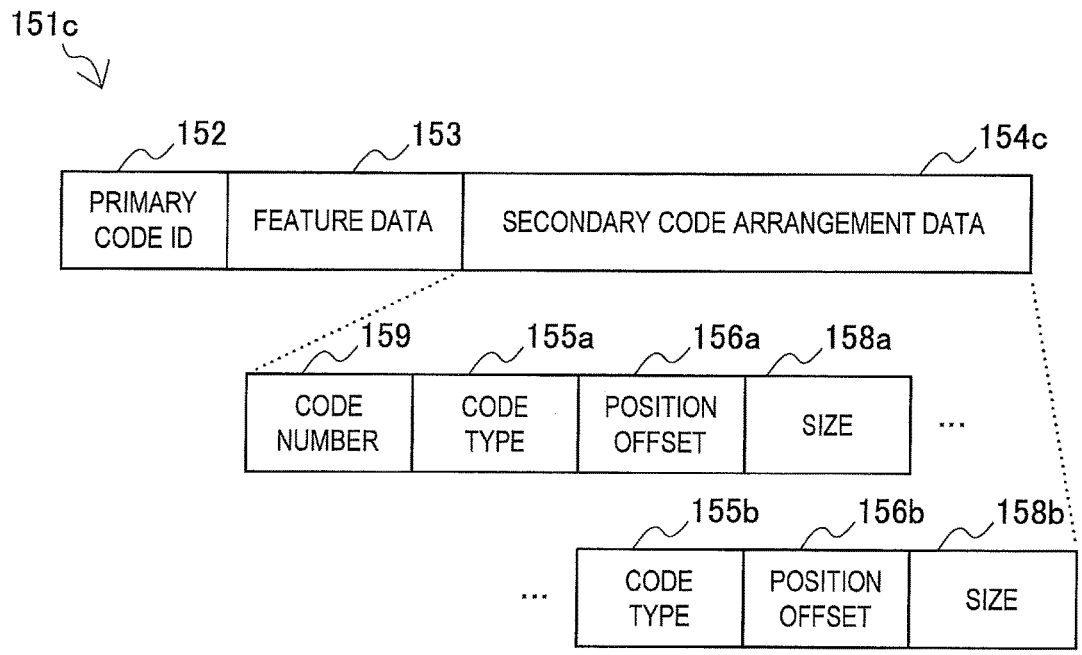
FIG. 8C is an explanatory diagram showing a third example of a configuration of recognition dictionary data.

FIG. 8C is an explanatory diagram showing a third example of a configuration of recognition dictionary data which may be stored in the recognition DB 150. As shown in FIG. 8C, recognition dictionary data 151*c* includes a primary code ID 152, feature data 153, and secondary code arrangement data 154*c*. The secondary code arrangement data 154*c* includes a code number 159 and a set of arrangement data of a number indicated by the code number 159. A first set of arrangement data includes a code type 155*a*, a position offset 156*a*, and a size 158*a*. A second set of arrangement data includes a code type 155*b*, a position offset 156*b*, and a size 158*b*. In the case where a composite secondary recognition target is used as shown in FIG. 5, a type and an arrangement of an individual secondary recognition target can be defined by using such data format.

(3) Recognition Unit

The recognition unit 160 recognizes an arrangement of a primary recognition target in an input image by performing image recognition on the primary recognition target. For example, the recognition unit 160 may recognize the primary recognition target shown in the input image by matching image feature amounts extracted from the input image against a known feature amount set stored in the recognition DB 150. On the other hand, the recognition unit 160 may recognize the primary recognition target shown in the input image by matching patterns included in the input image against known patterns stored in the recognition DB 150. In addition, the recognition unit 160 recognizes how the primary recognition target is arranged and shown in the input image on the basis of a positional relation between the detected feature points, or a shape and size of the detected pattern.

Figure 11A:
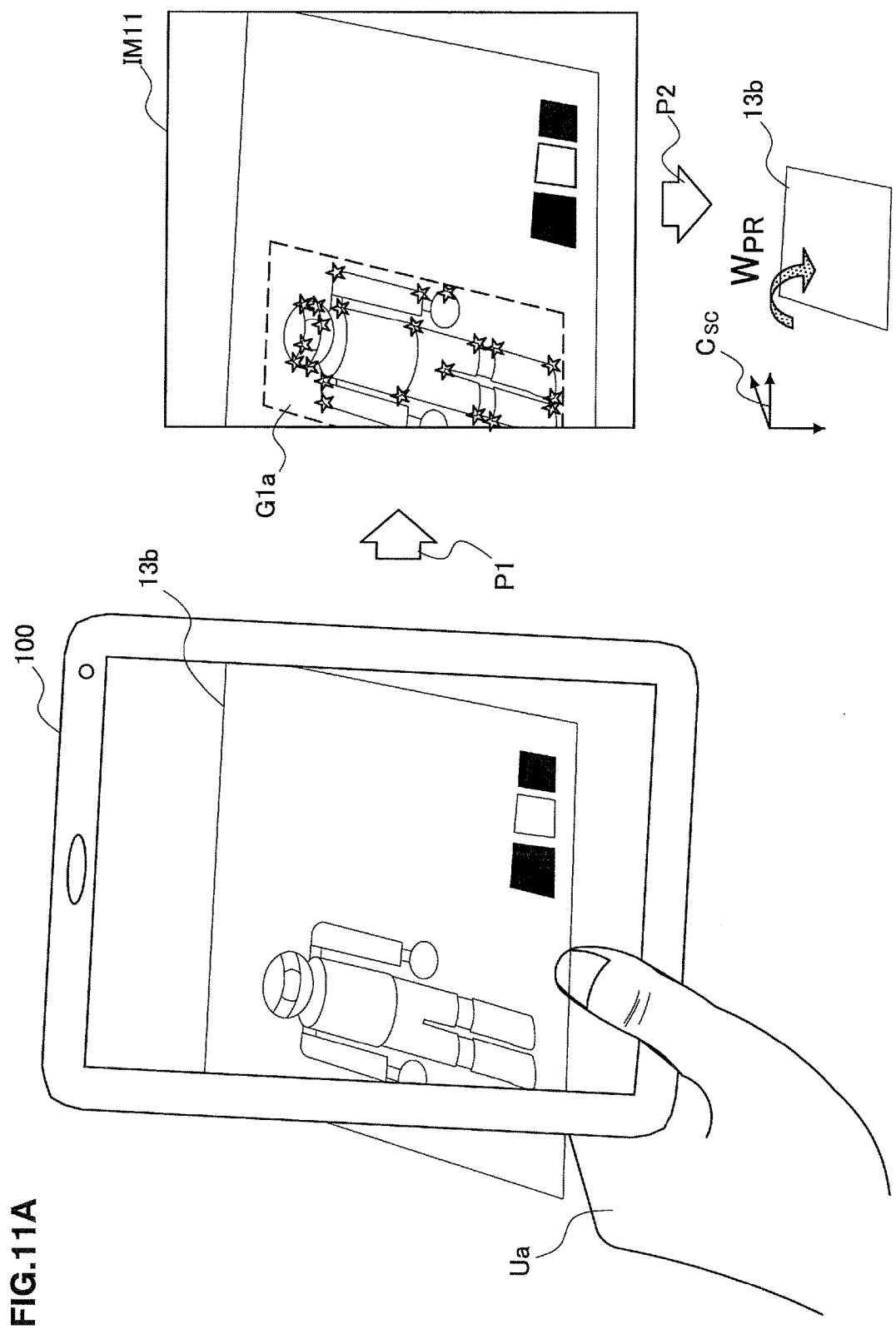
FIG. 11A is an explanatory diagram illustrating an example of recognition of a primary recognition target.

FIG. 11A is an explanatory diagram illustrating an example of recognition of a primary recognition target. The left-hand side of FIG. 11A shows a scene where the user Ua holds the image processing apparatus 100 over the card 13*b*. The image acquisition unit 140 acquires an input image IM11 capturing the card 13*b*. In the input image IM11, there is shown the primary recognition target G1a imaged from obliquely above. The recognition unit 160 extracts feature points from the input image IM11 (Processing P1) according to a publicly-known corner detection method such as Harris method or Moravec method. Stars in FIG. 11A indicate a plurality of feature points extracted from the input image IM11. The recognition unit 160 recognizes that the primary recognition target G1a is shown in the input image IM11, by matching feature amounts including position coordinates of the feature points against the set of feature amounts of the primary recognition target G1a that are recorded in advance in the recognition DB 150. The recognition unit 160 also recognizes a three-dimensional arrangement of the primary recognition target G1a. For example, the recognized three-dimensional arrangement may be represented by a homogeneous transformation matrix $W_{PR}$ in a three-dimensional screen coordinate system $C_{SC}$ corresponding to an imaging surface and a depth of the imaging surface (Processing P2). The homogeneous transformation matrix $W_{PR}$ substantially represents a relative arrangement of the camera 102 capturing an input image to the real object 13*b*. In this way, the image recognition unit 160 outputs, to the control unit 180, the homogeneous transformation matrix corresponding to the identifier (primary cord ID) of the recognized primary recognition target.

On the basis of the above-described image recognition of the primary recognition target, the image recognition unit 160 further recognizes the secondary recognition target. For example, the recognition unit 160 performs recognition processing on a partial image of the secondary recognition target acquired from the input image. A part in which the secondary recognition target is shown is determined by using a result of the image recognition of the primary recognition target and the above-described arrangement data. In the case where there are two or more kinds of candidates for a type of the secondary recognition target, the type of secondary recognition target to be recognized is also defined by the above-described arrangement data, and a recognition processing to be performed may be selected with reference to the definition. In the case where the secondary recognition target includes a plurality of fields as shown in FIGS. 2A and 2B, the recognition unit 160 reads, from a partial image, a parameter such as brightness or color of each field, and decides a code value corresponding to a combination of read parameters. In the case where a secondary recognition target is a bar code as shown in FIGS. 3A and 3B, the recognition unit 160 executes a general bar-code reading processing and decodes a code value.

FIG. 11B is an explanatory diagram illustrating an example of recognition of a secondary recognition target. The left-hand side of FIG. 11B again shows the input image IM11 explained with reference to FIG. 11A. When the input image IM11 is subjected to an inverse transformation using an inverse matrix $W_{PR}^{-1}$ of the homogeneous transformation matrix $W_{PR}$, a transformation image IM12 is generated (Processing P3), the transformation image IM12 being transformed in a manner that the print surface of the real object 13b faces the imaging surface. The arrangement of the secondary recognition target G2b in the transformation image IM12 is determined from the arrangement of the primary recognition target G1a in accordance with secondary code arrangement data included in the recognition dictionary data (Processing P4). The recognition unit 160 performs recognition processing corresponding to a type of the secondary recognition target G2b, on a partial image of the secondary recognition target G2b determined in this way. Subsequently, the recognition unit 160 outputs, to the control unit 180, a code value recognized as a result of the recognition processing.

(4) Object DB

The object DB 170 is a database for storing object data used by the control unit 180 described later. The object data defines mapping between respective various AR objects arranged in the AR space and a code value corresponding to the secondary recognition target. The object data may be defined by respective candidates of the primary recognition target.

FIG. 10 is an explanatory diagram showing an example of a configuration of object data that may be stored in the object DB 170. As shown in FIG. 10, object data 171 includes a primary code ID 172, a secondary code value 173, an object ID 174, a position 175, an attitude 176, and graphic data 177. The primary code ID 172 is an identifier for identifying respective candidates for the primary recognition target. The secondary code value 173 indicates candidates for a code value which the secondary recognition target may recognize. The object ID 174 is an identifier for uniquely identifying the AR object. The position 175 defines a three-dimensional position where the AR object is arranged in the AR space. The attitude 176 defines a three-dimensional attitude where the AR object is arranged in the AR space. For example, the position and attitude of the AR object in the AR space is defined on the basis of a relative relation to the corresponding primary recognition target. The graphic data 177 is a data used for generating an image of the AR object, and the graphic data 177 may define a polygon, a texture, animation, and other display attributes for example.

(5) Control Unit

The control unit 180 sets an AR space associated with an input image on the basis of a result of image recognition performed on a primary recognition target by the recognition unit 160. For example, the control unit 180 can set a print surface of a real object in the input image as a horizontal plane in the AR space, the horizontal plane being used as a base for attitude or movement of the AR object. A relative attitude of the print surface with respect to an imaging surface may be represented by a homogeneous transformation matrix $W_{PR}$ input by the recognition unit 160. On the other hand, the control unit 180 can also set a position of the primary recognition target in the input image as a reference position on which the AR object is arranged in the AR space. A position of the primary recognition target in the AR space can also be represented by the homogeneous transformation matrix $W_{PR}$.

The control unit further decides which object is arranged in the AR space, depending on a code value of a secondary recognition target recognized by the recognition unit 160. For example, the control unit 180 uses an arrangement data stored in the recognition DB 150, and determines an arrangement of the secondary recognition target to be recognized on the identical real object, from an arrangement of the primary recognition target recognized by the recognition unit 160. In the case where a type of the secondary recognition target is defined from arrangement data, the control unit 180 may select a recognition processing to be performed by the recognition unit 160, on the basis of a type (code type) of a secondary recognition target defined from the arrangement data. The control unit 180 causes the recognition unit 160 to perform recognition processing on a secondary recognition target shown in the input image. Next, when a code value of the secondary recognition target recognized by the recognition processing is input from the recognition unit 160, the control unit 180 decides an AR object mapped to the code value in the object data 177, as an AR object to be arranged in the AR space. In the case where there is a plurality of candidates for a primary recognition target, the control unit 180 uses, for deciding an AR object, object data corresponding to a primary recognition target recognized by the recognition unit 160 from among the plurality of candidates.

When the AR object to be arranged is decided with reference to the object data, the control unit 180 arranges the AR object in the AR space in accordance with the definition in the object data. In addition, the control unit 180 generates an image of the AR object seen from a perspective of the camera 102, on the basis of the result of the image recognition by the recognition unit 160. Subsequently, by overlaying the image of the AR object on the input image, the control unit 180 generates an output image and causes the generated output image to be displayed on the screen of the display 110.

Figure 11C:
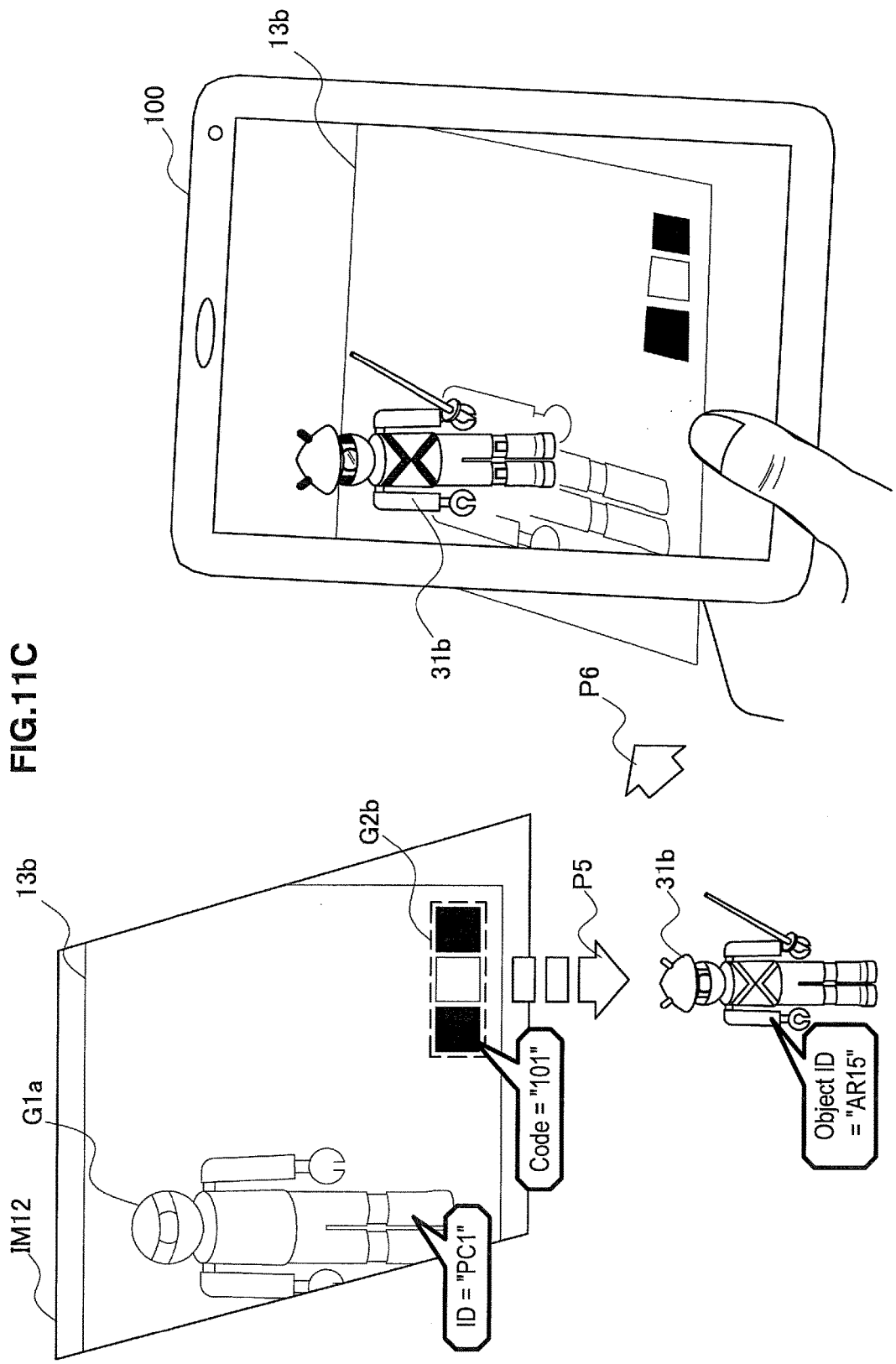
FIG. 11C is an explanatory diagram illustrating an example of decision and arrangement of an AR object.

FIG. 11C is an explanatory diagram illustrating an example of decision and arrangement of an AR object. The left-hand side of FIG. 11C again shows the transformation image IM12 explained with reference to FIG. 11B. For example, a primary code ID of the primary recognition target G1a shown in the transformation image IM12 is "PC1". A code value of the secondary recognition target G2b read by performing the recognition processing on the secondary recognition target G2b shown in the transformation image IM12 is, for example, "101". The control unit 180 refers to record having a secondary code value "101" in a subset corresponding to a primary code ID "PC1" in the object data 171, and then decides to arrange an AR object 31b having an object ID "AR15" in the AR space (Processing P5). In addition, the control unit 180 arranges the AR object 31b on a position of the primary recognition target G1a in the input image as if the AR object 31b is on the print surface of the real object 13b, and an image of the arranged AR object 31b is overlaid on the input image (Processing P6).

Figure 12:
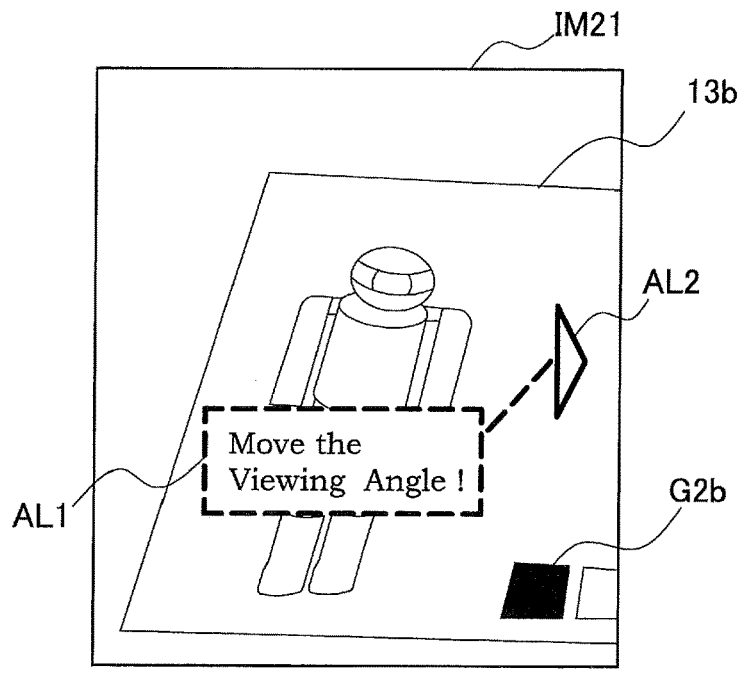
FIG. 12 is an explanatory diagram showing an example of a display object recommending to change an angle of view.

The control unit 180 may determine whether a secondary recognition target to be recognized is sufficiently shown in the input image, from an arrangement of the secondary recognition target to be determined using arrangement data, for example. In the case where a main part of the secondary recognition target is present outside of the input image, the control unit 180 determines that secondary recognition target is not sufficiently shown in the input image. In the case where the control unit 180 determines that secondary recognition target is not sufficiently shown in the input image, the control unit 180 can cause a display object recommending to change an angle of view to be displayed on the screen. For example, as shown in FIG. 12, display objects AL1 and AL2 are overlaid on an image IM21. In the image IM 21, the real object 13b is shown. However, one or more fields of the secondary recognition target G2b of the real object 13b are partly out of the angle of view of the image IM21 at right. The display object AL1 is a textbox to display a massage recommending a user to change the angle of view. The display object AL2 is a triangle icon indicating a direction to move the angle of view. In accordance with the display objects AL1 and AL2, the user moves the angle of view rightward (or widen the angle of view by zooming out), and images the whole secondary recognition target so as to successfully display the AR object.

Figure 13:
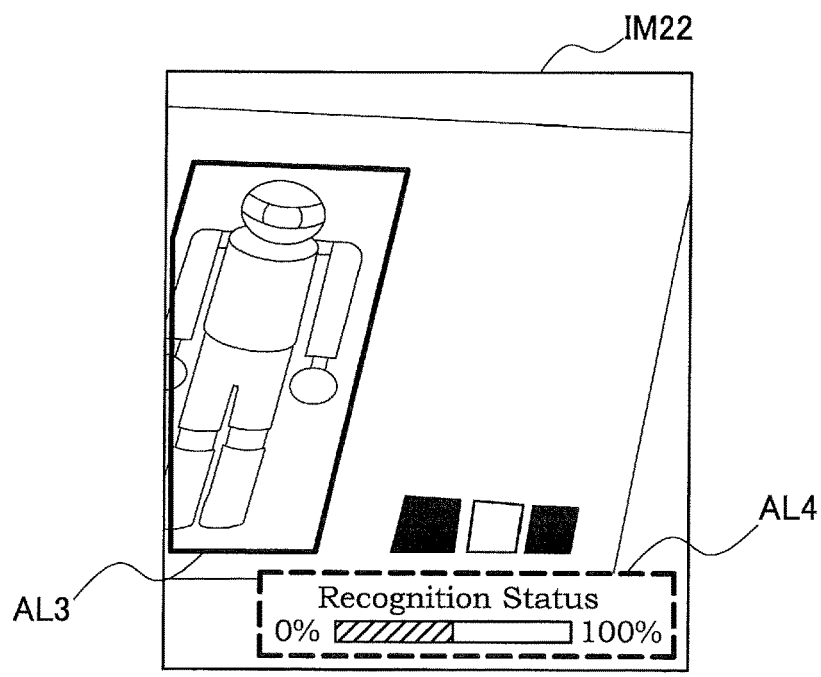
FIG. 13 is an explanatory diagram showing an example of a display object that notifies a user of a recognition status.

The control unit 180 may cause at least one of a recognition status of the primary recognition target and a recognition status of the secondary recognition target to be displayed on the screen of the display 110. For example, as shown in FIG. 13, display objects AL3 and AL4 are overlaid on an image IM22. The display object AL3 is a frame surrounding the successfully-recognized primary recognition target. Instead of (or in addition to) the frame surrounding the primary recognition target, icons indicating feature points extracted from the image IM22 may be displayed. The display object AL4 is an indicator of a recognition status. In the example shown in FIG. 13, the indicator shows 50 percent progress. This indicates that recognition of the primary recognition target is succeeded but recognition of the secondary recognition target is not completed. By seeing such recognition status, the user can know a state of the AR application in real time. The display of the recognition status may be hidden automatically after the recognition of the secondary recognition target is completed, in order not to interrupt a visibility of the AR application.

2-3. Flow of Processing

Figure 14:
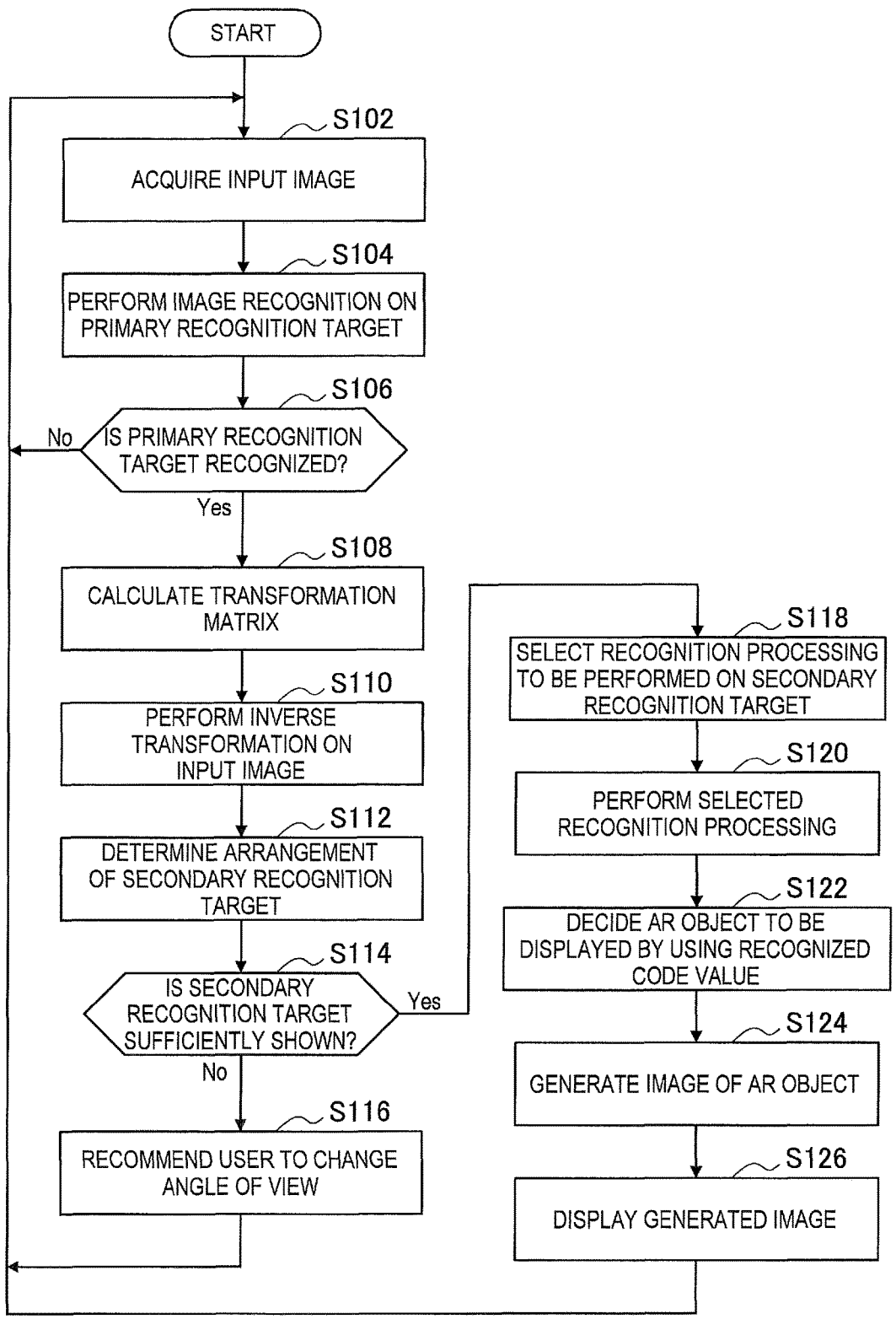
FIG. 14 is a flowchart showing an example of a flow of image processing according to an embodiment.

FIG. 14 is a flowchart showing an example of a flow of image processing performed by the image processing device 100 according to an embodiment. Processing shown in FIG. 14 is repeated for each of a series of the input images captured by the camera 102.

With reference to FIG. 14, first, the image acquisition unit 140 acquires, from the camera 102, an input image showing a real object having a primary recognition target and a secondary recognition target (Step S102). Subsequently, the image acquisition unit 140 outputs the acquired input image to the recognition unit 160 and the control unit 180.

Next, the recognition unit 160 performs image recognition on the primary recognition target using recognition dictionary data stored in the recognition DB 150 (Step S104). In this embodiment, the recognition dictionary data includes feature data of primary recognition targets, the number of the primary recognition targets being less than the number of AR objects that may be displayed. Accordingly, processing cost of the image recognition performed here is reduced to a low level.

Subsequently, the recognition unit 160 determines whether or not any primary recognition target is recognized (Step S106). In the case where the primary recognition target is not recognized, the processing returns to Step S102 and a next image is acquired. In the case where the primary recognition target is recognized, the recognition unit 160 calculates transformation matrix (for example, the homogeneous transformation matrix) indicating a three-dimensional arrangement of the primary recognition target (or, real object) to the camera 102 (Step S108). Next, the recognition unit 160 outputs, to the control unit 180, an identifier of the recognized primary recognition target and the calculated transformation matrix.

The control unit 180 performs an inverse transformation on the input image by using an inverse matrix of the transformation matrix input from the recognition unit 160, and generates a transformed image transformed in a manner that the primary recognition target and the secondary recognition target faces an imaging surface (Step S110). Next, the control unit 180 determines an arrangement of the secondary recognition target in the transformed image by using arrangement data included in the recognition dictionary data (Step S112).

Subsequently, on the basis of the determined arrangement of the secondary recognition target, the control unit 180 determines whether the secondary recognition target is sufficiently shown in the input image (Step S114). In a case where it is determined that the secondary recognition target is not sufficiently shown in the input image, the control unit 180 causes a display object recommending to change an angle of view to be displayed on a screen (Step S116). After that, the processing returns to Step S102. On the other hand, in a case where it is determined that the secondary recognition target is sufficiently shown in the input image, the control unit 180 selects, on the basis of a code type of the secondary recognition target defined by the arrangement data, recognition processing to be performed by the recognition unit 160 (Step S118). Next, the control unit 180 causes the recognition unit 160 to perform the selected recognition processing on the secondary recognition target shown in the input image (Step S120). The recognition unit 160 outputs, to the control unit 180, a code value recognized from a result of the recognition process.

Next, the control unit 180 refers to object data stored in the object DB 170 by using the code value (and an identifier of the primary recognition target) recognized by the recognition unit 160, and decides an AR object to be displayed (Step S122). Note that, the control unit 180 may also refer to object data on a data server connected via the communication interface 112 instead of the object DB 170. Subsequently, the control unit 180 generates an image of the decided AR object on the basis of the result of the image recognition of the primary recognition target (Step S124). Next, the control unit 180 causes an output image to be displayed on the screen of the display 110, the output image being generated by overlaying the image of the AR object on the input image (Step S126).

3. APPLICATION EXAMPLE

3-1. Example of Real Object

A real object used in embodiments of the present disclosure may be any kind of real object having a recognition target on a surface thereof. For example, various print media such as a poster, an advertising sign, a flier, a magazine, a newspaper, a book, and a trading card can be used as real objects of embodiments of the present disclosure by printing a primary recognition target and a secondary recognition target or an edit area for the secondary recognition target on a print surface of each of the print media. On a print surface, guidance can be printed, the guidance leading a user to hold, over a print medium, the imaging apparatus (for example, the camera 102 of the image processing apparatus 100) collaborating with an AR application.

One of the purposes of the print media is a trading card for a card game. For example, primary recognition targets having a common appearance (for example, a design of game character) are printed on a plurality of cards, and secondary recognition targets in which different code values are encoded are printed on the cards, respectively. The primary recognition targets are used for associating an AR space with an image showing the print media. The secondary recognition targets are used for deciding AR objects to be arranged in the AR space. A relative arrangement of the secondary recognition target to the primary recognition target in the print surface is fixed. A user who purchased a card holds the camera 102 of the image processing apparatus 100 over the purchased card. Accordingly, an AR object associated with a character printed on the card is displayed on the screen. Each of the AR objects includes a different attribute depending on a code value recognized from the secondary recognition target. Here, the attribute may be an attribute associating with an appearance of the AR object, or another attribute (for example, a level of a character) affecting a game process. When such trading card is achieved, it can be possible to enhance variety of AR objects and to encourage a purchase intension or collection desire of users without increasing processing cost of the image recognition. In the case where the edit area of the secondary recognition target is printed on the card instead of the secondary recognition target, the user can change an attribute of the AR object to be displayed by editing the secondary recognition target after obtaining the card. Accordingly, a monotonization of a card-game process can be prevented. The trading cards may be dealt to each user one at a time, or may be dealt to each user as a set.

Another purpose of the print media is an advertisement poster. For example, primary recognition targets having a common appearance (for example, a photograph of a product) are printed on a plurality of posters, and secondary recognition targets in which different code values are encoded are printed on the posters, respectively. A user finds a poster at a place such as a mall or a station, and holds the camera 102 of the image processing apparatus 100 over the found poster. Accordingly, an AR object corresponding to the product printed on the poser is displayed on the screen. Each of the AR objects includes a different attribute depending on a code value recognized from the secondary recognition target. It is possible to change code values according to places of posters so as to provide each user who visits the place with an AR object including an attribute suitable to the place. When such advertising poster is achieved, processing cost of image recognition is not increased, variety of AR objects is enhanced, attention of the user is aroused to the product, and an advertisement effect is increased. The advertisement posters may be provided to each business operator one at a time, or may be provided to each business operator as a set.

Figure 15:
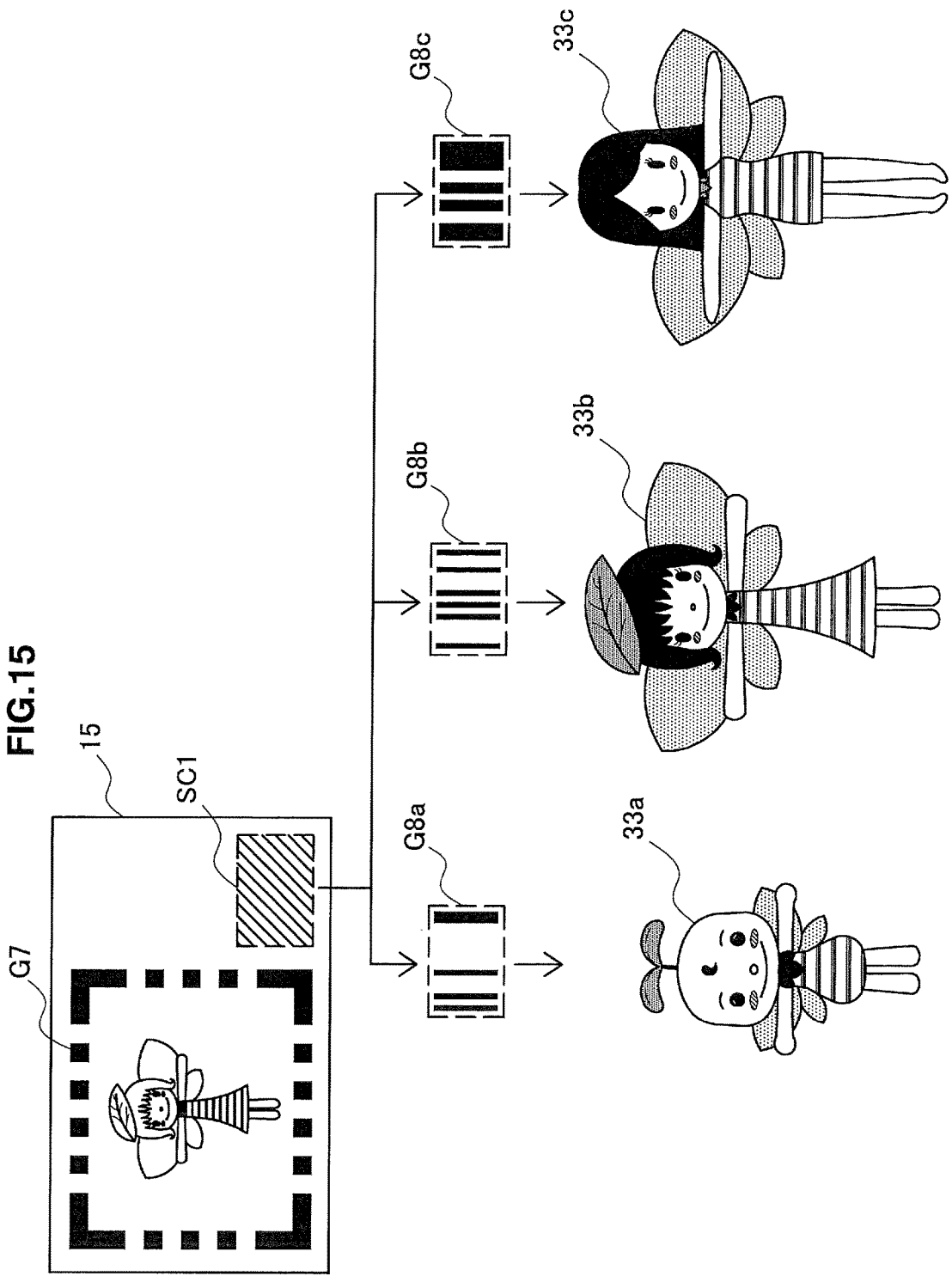
FIG. 15 is an explanatory diagram illustrating an example of a print medium having a scratch layer.

With regard to the treading cards or any other purpose, a print medium may further include a scratch layer that is formed on a position to cover a secondary recognition target on a print surface. FIG. 15 is an explanatory diagram illustrating an example of a print medium having a scratch layer. FIG. 15 shows a treading card 15 as an example. The trading card 15 includes a primary recognition target G7 printed on the print surface and a scratch layer SC1 laminated on the print surface. The scratch layer SC1 is formed on the position to cover the secondary recognition target. When the user scratches the scratch layer SC1, the secondary recognition target is exposed and become visible. For example, in the case where the secondary recognition target G8a is exposed, an output image of the AR application shows an AR object 33a. In the case where the secondary recognition target G8b is exposed, an output image of the AR application shows an AR object 33b. In the case where the secondary recognition target G8c is exposed, an output image of the AR application shows an AR object 33c. When such scratch trading card is achieved, processing cost of image recognition is not increased, unexpectedness is provided to the AR object, and curiosity of users is increased.

3-2. Use of HMD

Figure 16:
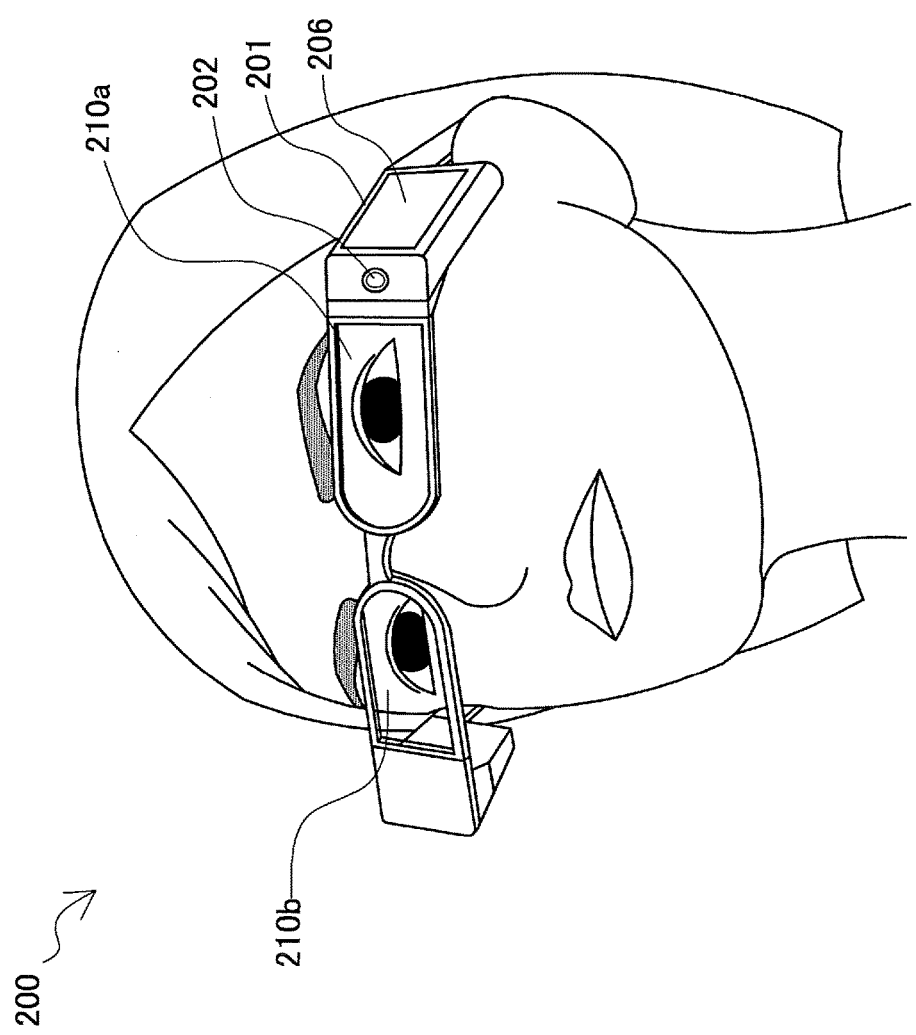
FIG. 16 is an explanatory diagram illustrating a modification of an image processing apparatus.

As described above, embodiments of the present disclosure may be achieved as an HMD device. FIG. 16 is an explanatory diagram illustrating a modification of an image processing apparatus. In the example of FIG. 16, an image processing apparatus 200 is a glasses-type HMD device mounted on a head of a user. The image processing apparatus 200 includes a main frame 201, a camera 202, a contact surface 206, and a pair of screens 210a and 210b. The main frame 201 includes a frame supporting the screens 210a and 210b and so-called temples positioned on sides of the head of the user. In the temples, several modules including memory and a processor for image processing are contained. The modules include functions similar to the variety of logical functions of the image processing apparatus 100 shown in FIG. 7. The camera 202 is arranged so that the optical axis of the lens is substantially parallel to sightlines of the user, and is used for capturing an image. The contact surface 206 is a surface to detect a touch performed by the user, and is used for causing the image processing apparatus 200 to receive a user input. The screen 210a and the screen 210b are see-through displays or non-see-through displays, and are respectively arranged in front of the left eye and the right eye of the user.

3-3. Collaboration of Plurality of Apparatuses

Embodiments of the present disclosure may be achieved by a plurality of apparatuses collaborating with each other. For example, a part of functions of the recognition unit 160 and the control unit 180 can be executed by apparatuses physically different from the image processing apparatuses 100 or 200.

FIG. 17 is an explanatory diagram illustrating a collaboration of a plurality of apparatuses. FIG. 17 shows an image processing apparatus 100 and a server apparatus 300 to communicate with the image processing apparatus 100. The server apparatus 300 may be on a personal network or a home network which is established near a user, or may be on a remote network such as the Internet. The image processing apparatus 100 transmits an input image to the server apparatus 300, for example (SIG1). The server apparatus 300 is an apparatus having functions of the recognition unit 160 and the control unit 180 that are shown in FIG. 7. The server apparatus 300 performs image recognition on an input image received from the image processing apparatus 100, and recognizes a primary recognition target and a secondary recognition target. Subsequently, on the basis of the recognition result, the server apparatus 300 decides an AR object to be arranged in an AR space, and transmits an image or graphic data of the decided AR object to the image processing apparatus 100 (SIG2). By using the data received from the server apparatus 300, the image processing apparatus 100 displays, on a screen, an output image in which the AR object is overlaid. According to this configuration, AR application can be provided to users even if the image processing apparatus 100 has a small amount of processing resource.

4. CONCLUSION

With reference to FIGS. 1 to 17, the embodiments of the present disclosure have been described in detail above. According to the embodiments, image recognition is performed on a primary recognition target of a real object shown in an input image, and a secondary recognition target of the same real object is further recognized on the basis of the image recognition. Subsequently, an AR space is set on the basis of the image recognition of the primary recognition target. An AR object arranged in the AR space is decided depending on the secondary recognition target. Accordingly, increase of the processing cost of heavy processing such as feature data matching for setting an AR space is suppressed, variety of secondary recognition targets is increased, and variety of AR objects to be displayed is increased.

Moreover, according to the embodiments, a relative arrangement of a secondary recognition target to a primary recognition target is fixedly defined, and an arrangement of the secondary recognition target to be recognized can be decided on the basis of the arrangement of the primary recognition target in the input image. According to this configuration, it is not necessary to perform a process to search the input image for a secondary recognition target whose arrangement is unknown in advance. Accordingly, processing cost to recognize the secondary recognition target is drastically reduced.

Moreover, according to the embodiments, the secondary recognition target can be recognized by performing recognition processing on a partial image that is acquired according to the arrangement data. The above described mechanism can be achieved with small cost of development by utilizing a generalized recognition module such as a barcode reader module. In the case where data that defines a type of the secondary recognition target is provided and recognition processing of the secondary recognition target can be switched by using the data, it becomes possible that a form of the secondary recognition target is flexibly selected according to a purpose of the AR application. Accordingly, by using the common mechanism, the AR application can be applied to broad purposes such as an advertisement, a game, and an education.

Moreover, according to the embodiments, the secondary recognition target includes a visible code which can be edited by a user, and the AR object can be mapped to the code read from the edited secondary recognition target. In this case, different AR objects can be displayed depending on how the user edits the secondary recognition target. Accordingly, monotonization of the AR application can be prevented, and attention of the user on the AR application can be kept.

The series of processing carried out by each of the apparatuses described in the present specification may be typically achieved by software. Programs that compose such software achieving the series of processing may be stored in advance for example on a storage medium (non-transitory media) provided inside or outside the apparatuses. During execution, such programs are written into random access memory (RAM) and executed by a processor such as a CPU.

Note that it is not necessary for the processing described in this specification with reference to the flowchart to be executed in the order shown in the flowchart. Some processing steps may be performed in parallel. Further, some of additional steps can be adopted, or some processing steps can be omitted.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below:

(1) An image processing apparatus including:
an image acquisition unit configured to acquire an image that shows a real object including a primary recognition target and a secondary recognition target; and
a control unit configured to set an augmented reality space associated with the image on the basis of image recognition of the primary recognition target, and configured to decide an augmented reality object to be arranged in the augmented reality space depending on the secondary recognition target that is recognized on the basis of the image recognition of the primary recognition target (2) The image processing apparatus according to (1),
wherein, according to an arrangement of the primary recognition target in the image, the control unit determines an arrangement of the secondary recognition target to be recognized, by using arrangement data that defines a relative arrangement of the secondary recognition target to the primary recognition target.

(3) The image processing apparatus according to (2),
wherein the control unit causes a display object recommending to change an angle of view to be displayed on a screen, in a case where it is determined, from the arrangement of the secondary recognition target, that the secondary recognition target is not sufficiently shown in the image.

(4) The image processing apparatus according to (2) or (3),
wherein the secondary recognition target is recognized by performing a recognition process on a partial image acquired in accordance with the arrangement of the secondary recognition target.

(5) The image processing apparatus according to (4),
wherein the arrangement data further defines a type of the secondary recognition target, and
wherein the recognition process for recognizing the secondary recognition target is selected on the basis of the type of the secondary recognition target that is determined by using the arrangement data.

(6) The image processing apparatus according to any one of (1) to (5),
wherein the secondary recognition target includes a visible code to be edited by a user, and
wherein, by using object data in which a code for recognizing the secondary recognition target is mapped to a corresponding augmented reality object, the control unit decides the augmented reality object to be arranged in the augmented reality space.

(7) The image processing apparatus according to (6),
wherein the object data is defined for each of a plurality of candidates for the primary recognition target, and
wherein, in order to decide the augmented reality object, the control unit uses the object data corresponding to the primary recognition target that is recognized from among the plurality of the candidates.

(8) The image processing apparatus according to any one of (1) to (7),
wherein the primary recognition target is one of a known image or a known pattern, and
wherein the image processing apparatus further includes a recognition unit to perform the image recognition by matching the image against feature data of one or more of known images or known patterns.

(9) The image processing apparatus according to any one of (1) to (8),
wherein the control unit causes at least one of a recognition status of the primary recognition target and a recognition status of the secondary recognition target to be displayed on a screen.

(10) The image processing apparatus according to any one of (2) to (5),
wherein the arrangement includes at least one of a position, an attitude, and a size of a recognition target.

(11) An image processing method including:
acquiring an image that shows a real object including a primary recognition target and a secondary recognition target;
setting an augmented reality space associated with the image on the basis of image recognition of the primary recognition target; and
deciding an augmented reality object to be arranged in the set augmented reality space depending on the secondary recognition target that is recognized on the basis of the image recognition of the primary recognition target.

(12) A program for causing a computer which controls an image processing apparatus to function as:
an image acquisition unit configured to acquire an image that shows a real object including a primary recognition target and a secondary recognition target; and
a control unit configured to set an augmented reality space associated with the image on the basis of image recognition of the primary recognition target, and configured to decide an augmented reality object to be arranged in the augmented reality space depending on the secondary recognition target that is recognized on the basis of the image recognition of the primary recognition target.

(13) A print medium including a print surface, the print medium including:
A primary recognition target that is printed on the print surface and that is used for associating an image showing the print medium with an augmented reality space; and
One of a secondary recognition target and an edit area for the secondary recognition target, which are printed on the print surface and which are used for deciding an augmented reality object to be arranged in the augmented reality space.

(14) A print-media set including:
A plurality of the print media according to (13),
Wherein two or more of the print media respectively include the primary recognition target having a common appearance and the secondary recognition target in which a different value is encoded.

(15) The print-media set according to (14),
Wherein, on print surfaces of two or more of the print media, a relative arrangement of the secondary recognition target to the primary recognition target is fixed.

(16) The print medium according to (13), further including:
The secondary recognition target; and
A scratch layer that is formed on a position to cover the secondary recognition target on the print surface.

What is claimed is:
1. An image processing apparatus, comprising:
an image acquisition unit configured to acquire an image of a real object, wherein the real object includes a primary recognition target and a secondary recognition target;
a recognition unit configured to:
recognize the primary recognition target in the image based on image recognition; and
calculate a transformation matrix that corresponds to the recognized primary recognition target, wherein the transformation matrix indicates an arrangement of a camera relative to the primary recognition target, and wherein the camera captures the image;
a control unit configured to:
generate a transformed image corresponding to the image based on the transformation matrix;
recognize the secondary recognition target in the transformed image based on the recognized primary recognition target;
set an augmented reality space associated with the image based on the image recognition of the primary recognition target;
determine an augmented reality object to be arranged in the augmented reality space based on the primary recognition target; and
determine a display attribute of the augmented reality object based on a value of the secondary recognition target.

2. The image processing apparatus according to claim 1, wherein the control unit is further configured to
determine an arrangement of the secondary recognition target in the transformed image based on:
an arrangement of the primary recognition target in the image; and
arrangement data that defines the arrangement of the secondary recognition target relative to the primary recognition target.

3. The image processing apparatus according to claim 2, wherein the control unit is further configured to:
determine that the secondary recognition target is partially shown in the image based on the arrangement of the secondary recognition target; and
control display of a display object, on a screen, based on the secondary recognition target that is partially shown in the image, wherein the display object recommends a change in an angle of view of the camera that captures the image.

4. The image processing apparatus according to claim 2, wherein the secondary recognition target is recognized based on a partial image of the image acquired by the image acquisition unit; and wherein the partial image is determined based on the arrangement of the secondary recognition target.

5. The image processing apparatus according to claim 2, wherein the arrangement data further defines a type of the secondary recognition target, and
wherein a recognition process for recognition of the secondary recognition target is selected based on the type of the secondary recognition target.

6. The image processing apparatus according to claim 1, wherein the secondary recognition target includes a visible code editable by a user,
wherein the control unit is further configured to determine the augmented reality object to be arranged in the augmented reality space based on object data, and
wherein a code to recognize the secondary recognition target is mapped to the augmented reality object in the object data.

7. The image processing apparatus according to claim 6, wherein the object data is defined for each of a plurality of candidates for the primary recognition target, and
wherein the control unit is further configured to determine the augmented reality object based on the object data corresponding to the primary recognition target, wherein the primary recognition target is recognized from the plurality of candidates.

8. The image processing apparatus according to claim 1, wherein the primary recognition target is one of a known image of a plurality of known images or a known pattern of a plurality of known patterns, and
wherein the recognition unit is further configured to execute the image recognition based on a comparison of first feature data of the image with second feature data of at least one of the plurality of known images or the plurality of known patterns.

9. The image processing apparatus according to claim 1, wherein the control unit is further configured to control display of at least one of a first recognition status of the primary recognition target or a second recognition status of the secondary recognition target on a screen.

10. The image processing apparatus according to claim 2, wherein the arrangement of the primary recognition target and the arrangement of the secondary recognition target include at least one of a position, an attitude, or a size of the primary recognition target and the secondary recognition target.

11. An image processing method, comprising:
acquiring an image of a real object, wherein the real object includes a primary recognition target and a secondary recognition target;
recognizing the primary recognition target in the image based on image recognition;
calculating a transformation matrix that corresponds to the recognized primary recognition target, wherein the transformation matrix indicates an arrangement of a camera relative to the primary recognition target, wherein the camera captures the image;
generating a transformed image corresponding to the image based on the transformation matrix;
recognizing the secondary recognition target in the transformed image based on the recognized primary recognition target;
setting an augmented reality space associated with the image based on the image recognition of the primary recognition target;
determining an augmented reality object to be arranged in the set augmented reality space based on the primary recognition target; and
determining a display attribute of the augmented reality object based on a value of the secondary recognition target.

12. A non-transitory computer-readable medium having stored thereon, computer-executable instructions, which when executed by a computer, cause the computer to execute operations, the operations comprising:
acquiring an image of a real object, wherein the real object includes a primary recognition target and a secondary recognition target;
recognizing the primary recognition target in the image based on image recognition;
calculating a transformation matrix that corresponds to the recognized primary recognition target, wherein the transformation matrix indicates an arrangement of a camera relative to the primary recognition target, wherein the camera captures the image;
generating a transformed image that corresponds to the image based on the transformation matrix;
recognizing the secondary recognition target in the transformed image based on the recognized primary recognition target;
setting an augmented reality space associated with the image based on the image recognition of the primary recognition target;
determining an augmented reality object to be arranged in the augmented reality space based on the primary recognition target; and
determining a display attribute of the augmented reality object based on a value of the secondary recognition target.

13. A print medium, comprising:
a primary recognition target that is printed on a print surface of the print medium, wherein the primary recognition target is recognized based on image recognition, wherein the primary recognition target is a frame in which a character is printed in the print medium, and the frame is associated with an image that shows the print medium with an augmented reality space, wherein the frame further includes a secondary recognition target and an edit area for the secondary recognition target, and wherein the secondary recognition target is printed on the print surface, wherein
the primary recognition target is used to determine an augmented reality object to be arranged in the augmented reality space, and
the secondary recognition target is used to determine a display attribute of the augmented reality object based on a value of the secondary recognition target,
wherein the secondary recognition target is recognized in a transformed image based on the recognized primary recognition target,
wherein the transformed image corresponds to the image, wherein the transformed image is generated based on a transformation matrix,
wherein the transformation matrix indicates an arrangement of a camera relative to the primary recognition target, and wherein the camera captures the image.

14. A print-media set, comprising:
a plurality of print media, wherein each print media of the plurality of print media comprises:
a primary recognition target that is printed on a print surface of a corresponding print media of the plurality of print media, wherein the primary recognition target is recognized based on image recognition, wherein the primary recognition target is a frame in which a character is printed in the corresponding print media and the frame is associated with an image that shows the corresponding print media with an augmented reality space,
    wherein the frame further includes a secondary recognition target and an edit area for the secondary recognition target, and wherein the secondary recognition target is printed on the print surface, wherein
the primary recognition target is used to determine an augmented reality object to be arranged in the augmented reality space, and
the secondary recognition target is used to determine a display attribute of the augmented reality object based on a value of the secondary recognition target,
wherein the secondary recognition target is recognized in a transformed image based on the recognized primary recognition target,
wherein the transformed image corresponds to the image, wherein the transformed image is generated based on a transformation matrix,
    wherein the transformation matrix indicates an arrangement of a camera relative to the primary recognition target, wherein the camera captures the image, and
    wherein at least two of the plurality of print media respectively include the primary recognition target having a common appearance and the secondary recognition target different from the primary recognition target.

15. The print-media set according to claim 14, wherein, on print surfaces of the at least two of the plurality of print media, a relative arrangement of the secondary recognition target to the primary recognition target is fixed.

16. The print medium according to claim 13, further comprising a scratch layer on a position on the print surface to cover the secondary recognition target.

17. The image processing apparatus according to claim 1, wherein the recognition unit is configured to determine an appearance of the augmented reality object as the display attribute of the augmented reality object.

* * * * *